United States Patent [19]
Nishiguchi et al.

[11] Patent Number: 5,831,703
[45] Date of Patent: Nov. 3, 1998

[54] PHOTOSENSITIVE FILM HAVING BIREFRINGENCE AND LIQUID CRYSTAL DISPLAY DEVICE USING THE SAME AND METHOD FOR PRODUCING THE PHOTOSENSITIVE FILM AND THE LIQUID CRYSTAL DISPLAY DEVICE

[75] Inventors: Kenji Nishiguchi, Osaka; Tokihiko Shinomiya, Nara, both of Japan

[73] Assignee: Sharp Kabushiki Kaisha, Osaka, Japan

[21] Appl. No.: 702,763

[22] Filed: Aug. 22, 1996

[30] Foreign Application Priority Data

Aug. 31, 1995 [JP] Japan ................................. 7-224153

[51] Int. Cl.⁶ ................................................. G02F 1/1333
[52] U.S. Cl. ........................... 349/117; 349/156; 349/187
[58] Field of Search ............................. 349/86, 117, 116, 349/118, 119, 120, 121, 156; 428/1; 430/20; 156/273.3, 273.7, 275.5

[56] References Cited

U.S. PATENT DOCUMENTS

| | | | |
|---|---|---|---|
| 4,725,517 | 2/1988 | Nakanowatari et al. | 349/187 |
| 5,308,535 | 5/1994 | Scheuble et al. | 349/76 |
| 5,430,565 | 7/1995 | Yamanouchi et al. | 349/118 |
| 5,473,450 | 12/1995 | Yamada et al. | 359/51 |
| 5,486,403 | 1/1996 | Ishitaka et al. | 349/123 |
| 5,528,401 | 6/1996 | Narutaki et al. | 349/124 |
| 5,559,617 | 9/1996 | Mitsui et al. | 349/117 |
| 5,576,856 | 11/1996 | Kawazu et al. | 349/89 |
| 5,583,677 | 12/1996 | Ito et al. | 349/118 |
| 5,602,661 | 2/1997 | Schadt et al. | 349/117 |
| 5,612,803 | 3/1997 | Yamada et al. | 349/156 |

FOREIGN PATENT DOCUMENTS

| | | |
|---|---|---|
| 56-99384 | 8/1981 | Japan . |
| 59-201021 | 11/1984 | Japan . |
| 6-301015 | 10/1994 | Japan . |
| 7-138308 | 5/1995 | Japan . |

OTHER PUBLICATIONS

H. Hasebe, et al. International Display Research Conference pp. 161–164, 1994 "Properties of Novel UV Curable Liquid Crystal and Its Retardation Film".

*Primary Examiner*—Hung X. Dang
*Assistant Examiner*—Tai V. Duong
*Attorney, Agent, or Firm*—David G. Conlin; George W. Neuner

[57] ABSTRACT

A liquid crystal display device includes a pair of substrates provided with a plurality of pixels and a liquid crystal region formed of liquid crystal as a display medium, the liquid crystal region being interposed between the pair of substrates. A photosensitive film having birefringence is provided on at least one face on the liquid crystal region side of the substrates so as to surround at least one pixel.

20 Claims, 8 Drawing Sheets a (Original film)

⌒ Photosensitive polymer
• Photo polymerizable monomer
△ Photo polymerization initiator ↓ Drawing b Substrate ↓ Exposure hν
Photomask ↓ Development ↓ Drawing ↓ Exposure ↓ Development

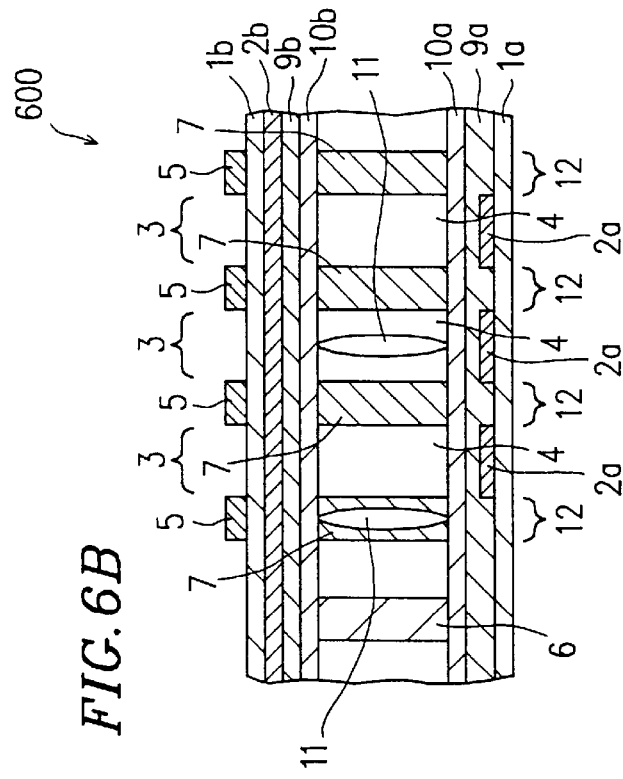
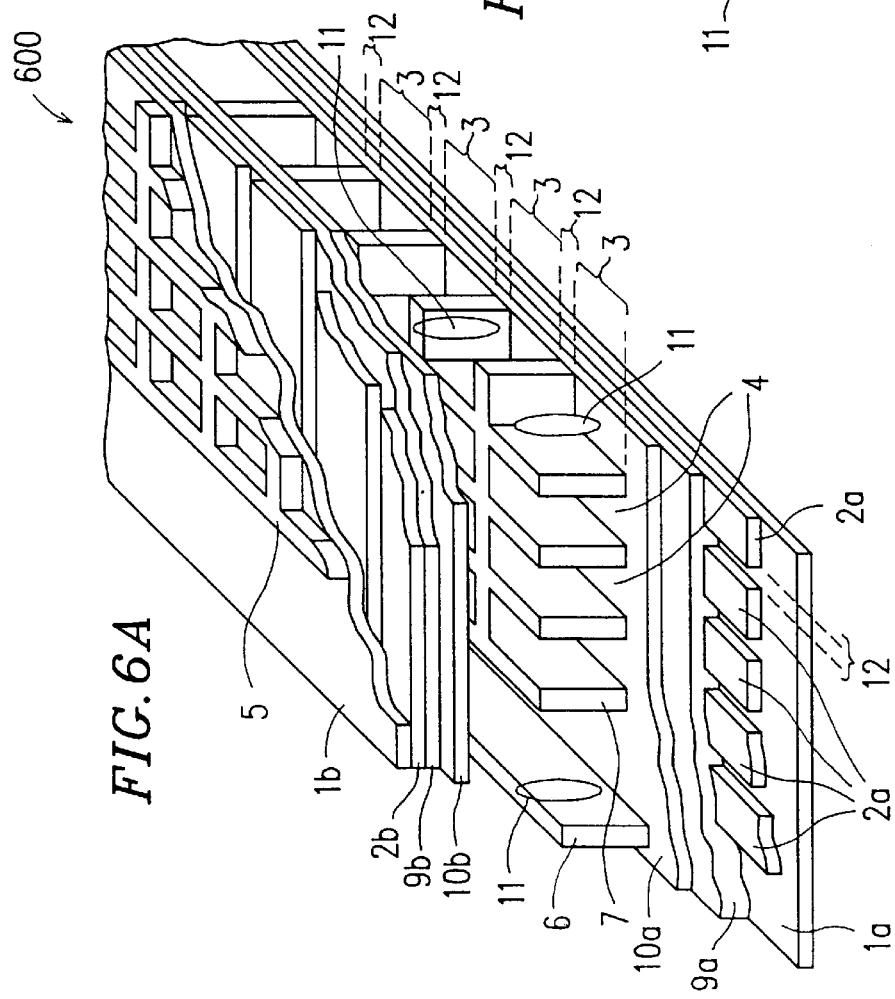
FIG.6A
FIG.6B

Upper substrate

A, A': Rubbing direction

B: Polarization axis of polarizing plate

Lower substrate

A, A': Rubbing direction

B': Polarization axis of polarizing plate

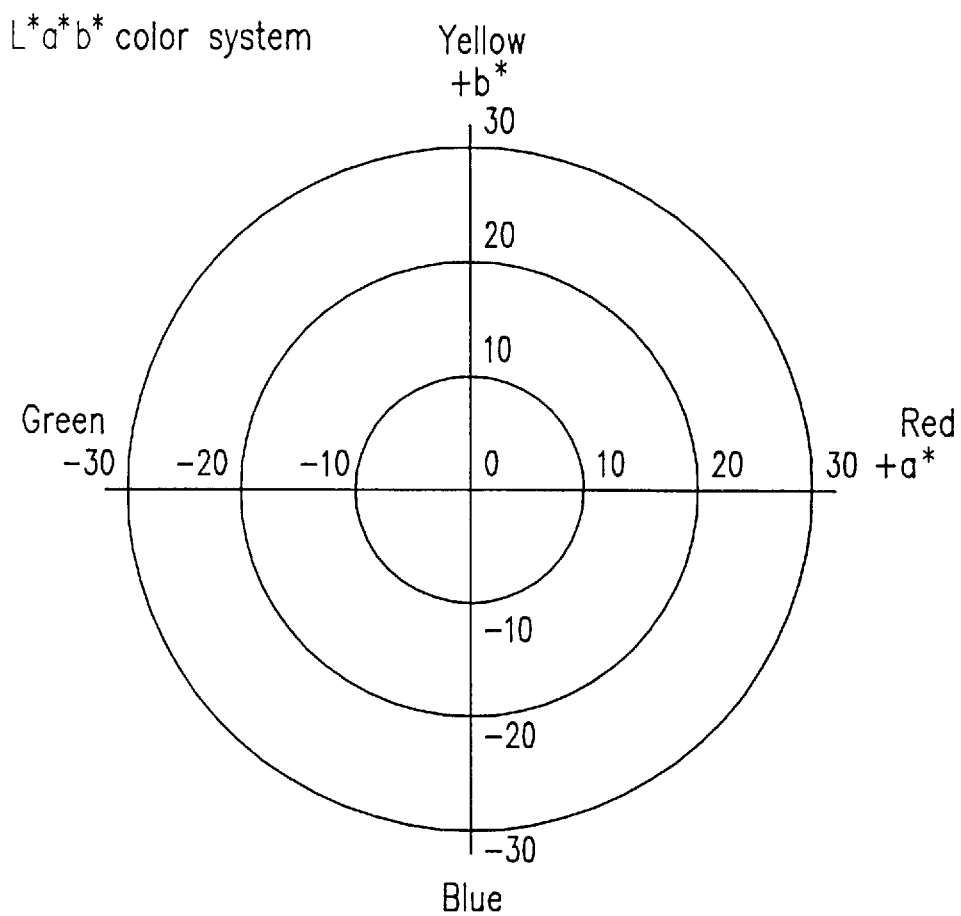

PHOTOSENSITIVE FILM HAVING BIREFRINGENCE AND LIQUID CRYSTAL DISPLAY DEVICE USING THE SAME AND METHOD FOR PRODUCING THE PHOTOSENSITIVE FILM AND THE LIQUID CRYSTAL DISPLAY DEVICE

BACKGROUND OF THE INVENTION

1. Field of the Invention

The present invention relates to a photosensitive film having birefringence and a liquid crystal display device using such a film, and a method for producing the photosensitive film and the liquid crystal display device. More specifically, the present invention relates to a liquid crystal display device including a region patterned to a predetermined pattern and having birefringence.

2. Description of the Related Art

A liquid crystal display device is increasingly in demand for use in office automation equipment, a personal computer, a portable information terminal or the like, because of such characteristics of being made thin and light, and low power consumption. The demand for such a liquid crystal display device will increase in view of a current situation where color display, as well as an enlarged screen and high capacity, becomes common.

The increasing demand for such a liquid crystal display device (i.e., a general purpose display device) is accompanied with the need for reducing cost. In order to meet the need, an STN type liquid crystal display device (STN-LCD) having a relatively simple structure is widely used as a display for a personal computer or the like. In order to effect color display in STN-LCD, it is necessary to perform hue compensation so as to effect black and white display by only STN-LCD. For this purpose, the hue compensation is conventionally performed by using a liquid crystal panel for hue compensation (DSTN) or a retardation film (FSTN).

A liquid crystal display device having the following structure is proposed: a liquid crystal region is disposed for each pixel, and polymer portions are arranged so as to surround the liquid crystal regions for the purpose of enhancing uniformity of the gap between a pair of substrates interposing the liquid crystal regions, or for improving the strength (e.g., impact resistance, pressure resistance) of the liquid crystal display device. For example, Japanese Laid-Open Patent Publication No. 56-99384 discloses a liquid crystal panel in which polymeric pillars made of a resist are used as spacers to be disposed in non-pixel portions. Japanese Laid-Open Patent Publication No. 59-201021 discloses a liquid crystal panel in which striped pillars made of a photosensitive resin or the like are used as spacers to be disposed in non-pixel portions. Furthermore, the Applicant proposed a liquid crystal panel utilizing phase separation between liquid crystal and a polymerizable resin, in which a phase-separated polymer forms walls surrounding pixels, and liquid crystal is disposed to be surrounded by the polymeric walls (Japanese Laid-Open Patent Publication No. 6-301015).

Furthermore, as a patterning technique for forming regions having various retardation in a predetermined area in a liquid crystal display device, a technique for forming a region having retardation varied for each pixel of R, G, B by using a polymerizable liquid crystal material is proposed (I.D.R.C. proceedings in 1994, pp.161 to 164). A retardation film used in the proposed technique is produced by irradiating pixels with ultraviolet rays in a state where an applied voltage is varied for each pixel of R, G and B, to cure the polymerizable liquid crystal material. According to this method, a retardation film having different tilt angles of the molecules of the polymerizable liquid crystal material from pixel to pixel can be obtained. As a result, a retardation film having different retardation corresponding to respective pixels of R, G and B can be produced. Thus, according to this proposed technique, it is possible to perform hue compensation for each color of R, G, and B.

However, the following problems arise in the above-mentioned liquid crystal display device and retardation film.

In the liquid crystal display device having polymeric portions (e.g., polymeric pillars or walls), in the case where a resist or photopolymerizable resin is used for the polymeric portions, the resist or photopolymerizable resin cannot have the same optical property as the liquid crystal. Thus, when light is incident to the liquid crystal display device, the hue of light passing through the liquid crystal portions is different from the hue of light passing through the polymeric portions. More specifically, since the polymeric portions are optically isotropic, the hue of the polymeric portions is determined by the hue generated by a polarizing plate or retardation film provided in the liquid crystal display device. Accordingly, it is extremely difficult to control the hue of the entire liquid crystal display device. In addition, the liquid crystal display device becomes dark as a whole due to an undesired color of the polymeric portions.

The above-mentioned problems are mostly caused by the fact that a conventional retardation film cannot be patterned to a predetermined pattern. The conventional retardation film is produced in a process where a polymer film is entirely drawn in a constant direction. Thus, it is extremely difficult to form the conventional retardation film with an arbitrary pattern and in a predetermined portion of a liquid crystal display device. As a result, for example, in a liquid crystal display device including a polymeric portion to improve the strength (e.g., impact resistance, pressure resistance) of the liquid crystal display device, or to enhance uniformity of the gap between the substrates, it is impossible to perform hue compensation in a liquid crystal portion independently from the polymeric portion (i.e, in an arbitrary position in the liquid crystal display device). The method proposed in I.D.R.C. proceedings in 1994, pp. 161 to 164 cannot be applied to such hue compensation, because the polymeric portion is formed in a non-electrode portion to which a voltage is not applied.

As described above, it is desired to realize a photosensitive film having birefringence in an arbitrary position (e.g., having hue compensation function, a predetermined retardation value, in an arbitrary position) and a liquid crystal display device having excellent display characteristics using such a photosensitive film, and a simple method for producing such a photosensitive film and liquid crystal display device.

SUMMARY OF THE INVENTION

A photosensitive film of the present invention has birefringence.

According to another aspect of the invention, a method for producing a photosensitive film having birefringence includes the steps of: forming a photosensitive film; and drawing the photosensitive film to align polymer molecules constituting the photosensitive film in a predetermined direction to provide birefringence.

According to another aspect of the invention, a liquid crystal display device includes a pair of substrates provided with a plurality of pixels and a liquid crystal region formed of liquid crystal as a display medium, the liquid crystal region being interposed between the pair of substrates. A photosensitive film having birefringence is provided on at least one face on the liquid crystal region side of the substrates so as to surround at least one pixel.

According to another aspect of the invention, a liquid crystal display device includes a pair of substrates provided with a plurality of pixels and a liquid crystal region formed of liquid crystal as a display medium, the liquid crystal region being interposed between the pair of substrates. A photosensitive film having birefringence is provided in stripes on at least one face on the liquid crystal region side of the substrates.

According to another aspect of the invention, a liquid crystal display device includes a pair of substrates provided with a plurality of pixels, a liquid crystal region formed of liquid crystal as a display medium, and a polymeric portion, the liquid crystal region and the polymeric portion being interposed between the pair of substrates. A photosensitive film having birefringence is provided in stripes on at least one face on the liquid crystal region side of the substrates. The polymeric portion and the photosensitive film adjacent thereto surround at least one pixel.

According to another aspect of the invention, a liquid crystal display device includes a pair of substrates provided with a plurality of pixels, a liquid crystal region formed of liquid crystal as a display medium and a polymeric portion, the liquid crystal region and the polymeric portion being interposed between the pair of substrates. A photosensitive film having birefringence is disposed on at least one face of at least one of the substrates, substantially corresponding to a pattern of the polymeric portion.

According to another aspect of the invention, a method for producing a liquid crystal display device includes the steps of preheating at least one substrate, and attaching a photosensitive film having birefringence to the preheated substrate with heat and pressure.

Thus, the invention described herein makes possible the advantages of (1) providing a photosensitive film having birefringence. (2) providing a liquid crystal display device including a region having birefringence in an arbitrary position by using such a film, (3) providing a liquid crystal display device excellent in display characteristics and strength (e.g., pressure resistance, impact resistance) and (4) providing a method simple and excellent in producibility for producing such a photosensitive film and such a liquid crystal display device.

These and other advantages of the present invention will become apparent to those skilled in the art upon reading and understanding the following detailed description with reference to the accompanying figures.

BRIEF DESCRIPTION OF THE DRAWINGS

FIG. 6A is a schematic perspective view illustrating still another exemplary liquid crystal display device of the present invention.

FIG. 6B is a cross sectional view illustrating the liquid crystal display device shown in FIG. 6A.

FIG. 8 is a graph illustrating the relationship between L*, a* and b* and colors in a CIE color system.

DESCRIPTION OF THE PREFERRED EMBODIMENTS

Figure 1A:
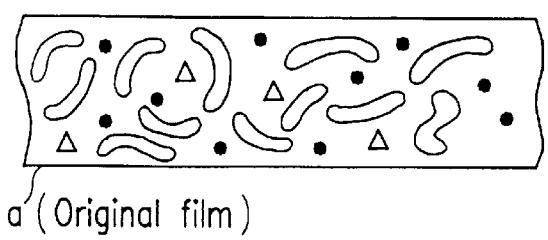
FIGS. 1A to 1D are schematic views illustrating pattern formation in negative photosensitive film, an example of a photosensitive film of the present invention.

Hereinafter, preferred embodiments of the present invention will be specifically described. However, the present invention is not limited to the following embodiments.

A. Photosensitive film

A photosensitive film of the present invention can be either negative or positive. Each case will be specifically described below.

A-1 Negative film

A negative photosensitive film of the present invention is formed of a mixture containing at least a photosensitive polymer, a photopolymerizable monomer and a photopolymerization initiator.

Examples of a photosensitive polymer include a polymer provided with photosensitivity by bonding a polymer having a reactive residue (e.g., hydroxyl group) to a photosensitive monomer.

Examples of the polymer having a reactive residue include perfect saponified poly(vinyl alcohol), partial saponified poly(vinyl alcohol) and the like. Furthermore, as a polymer having a reactive residue, polypeptide such as poly-D (or L)-lysine, poly-D (or L)-glutamic acid, poly-D (or L)-histidine can be also used. These polymers may be used singularly, or in a combination of two or more. The preferable polymers are perfect saponified poly(vinyl alcohol) and poly-L-glutamic acid, because they are particularly sensitive.

Any compound can be used as the photosensitive monomer, provided that it is a compound having a photopolymerizable group. Typical examples of the photosensitive monomer include a (meth)acrylic monomer (i.e., a monomer having (meth)acrylic group as a photopolymerizable group). Specific examples of such a monomer include 2-hydroxymethyl acrylate, 2-hydroxyethyl methacrylate, 2-hydroxypropyl acrylate, 2-hydroxypropyl methacrylate, N-vinyl pyrolidone, 2-hydroxyethylacryloyl phosphate, acrylamide, methacrylamide, N-methylolacrylamide, N-methylolmethacrylamide, N-methoxymethylacrylamide, N-ethoxymethylacrylamide, ethyleneglycol monoacrylate, dipropyleneglycol monoacrylate, N,N-dimethylaminoethylene acrylate, isobornyl methacrylate, hexamethylenediol diacrylate. These monomers may be used singularly, or in a combination of two or more. The preferable monomers are 2-hydroxyethyl methacrylate and methacrylamide, because they are particularly sensitive.

The above-mentioned polymers having a reactive residue and the above-mentioned photosensitive monomers can be reacted directly with each other, or can be reacted together with a bifunctional compound. Typical examples of the bifunctional compound include a diisocyanate compound. Specific examples of such a compound include 2,4-tolylenediisocyanate, 2,6-tolylenediisocyanate, m-xylylenediisocyanate, diphenylmethane-4,4'-diisocyanate, hexamethylenediisocyanate, isophorone diisocyanate, lysineisocyanate, modified diisocyanate and hydrogenated diisocyanate thereof or the like. These compounds can be used singularly or in a combination of two or more. The preferable bifunctional compounds are m-xylylenediisocyanate and hexamethylenediisocyanate, because they are particularly sensitive.

If necessary, in order to further improve film formation, a polymer not having a reactive residue can be suitably contained in the photosensitive polymer. Such a polymer is not particularly specified, but a thermoplastic resin can be used.

As a photopolymerizable monomer, the above-mentioned photosensitive monomers can be used. The preferable photopolymerizable monomers are hexamethylenediol diacrylate and isobornyl methacrylate, because they are particularly sensitive. The amount of photopolymerizable monomer used in the mixture is preferably in a range of 1 to 50 parts by weight on the basis of 100 parts by weight of the photosensitive polymer.

As a photopolymerization initiator, a known initiator (e.g., Irgacure 651 manufactured by Ciba-Geigy Corporation) can be used.

Preferably, at least one of the faces of the photosensitive film of the present invention may be covered with a polymer sheet, a polymer film or a paper (hereinafter, referred to as a cover sheet). Typical examples of a polymer forming the cover sheet include polyethylene terephthalate, polyethylene or the like. A thickness of the cover sheet can be varied depending on purposes, but preferably 0.01 to 1 mm. At least one of the faces of the photosensitive film is covered with the cover sheet so that the film can be wound onto a roll even if the photosensitive film has adhesion. As a result, it is possible to continuously attach the photosensitive films to a substrate or the like. Thus, manipulation of the photosensitive film is significantly improved.

A dry film, an example of a photosensitive film having a cover sheet, has a three layered structure including a base layer, a photosensitive layer and a covering layer.

The base layer is formed of, for example, polyester such as polyethylene terephthalate. The base layer can be produced in a known method for forming a film. The photosensitive layer is formed by applying a photo resist onto the base layer.

The photosensitive layer is formed of a mixture containing the above-mentioned photosensitive polymer, the above-mentioned photopolymerizable monomer and the above-mentioned photopolymerization initiator.

The covering layer prevents the photosensitive layer from drying and swelling, and makes it possible that the dry film is wound onto a roll without allowing the photosensitive layer to be adhesive.

An exemplary method for producing a photosensitive film of the present invention will be described below.

At first, a mixture of predetermined amounts of the above-mentioned components is kneaded in the presence of heat. The heating temperature and the length of kneading period can be varied depending on characteristics of the targeted film, but the heating temperature is preferably 30° to 300° C., and the kneading period is preferably 10 to 240 minutes. If necessary, spacers may be kneaded together with the mixture. By mixing the spacers to the mixture, the following advantages can be attained: In the case where the photosensitive film of the present invention is used in a liquid crystal display device or the like, it is possible to control the gap between the substrates of the device. Moreover, it is possible to dispose spacers only in a portion where the photosensitive film is arranged so as to reduce disturbance in alignment of liquid crystal molecules due to spacers.

The kneaded mixture is formed into an original film. The film can be formed by any known method. Typical examples of the method include a T die casting method. For example, the casting temperature during T die casting is preferably 200° to 250° C.

Next, after the original film is preheated, if necessary, the film is subjected to a drawing process to align polymer molecules constituting the film in a predetermined direction. The preheating temperature is preferably 80° to 120° C. Specific examples of the drawing process include a uniaxial drawing process or biaxial drawing process (which includes simultaneous biaxial drawing process and sequential biaxial drawing process). Typical examples of the uniaxial drawing process include a uniaxial drawing process to the direction of MD or TD using a tenter. A drawing ratio is preferably three to five times.

The drawn film may be further allowed to pass through a heating zone and a cooling zone. The temperature in the heating zone is preferably 180° to 220° C. The temperature in the cooling zone is preferably 80° to 120° C. The length of processing period in the heating zone is preferably 1 to 1.5 times the length of time period for the drawing process. The length of processing period in the cooling zone is preferably 0.4 to 0.8 times the length of the time period for the drawing process.

A thickness of the thus obtained photosensitive film of the present invention can be varied depending on targeted characteristics, but is preferably 50 to 5000 $\mu$m, and more preferably 100 to 2000 $\mu$m. A retardation value of the obtained film is preferably 90 to 800 nm, more preferably 200 to 800 nm, and most preferably 400 to 600 nm.

With reference to FIGS. 1A to 1D, the mechanism by which the photosensitive film of the present invention is patterned in an arbitrary pattern will be described.

Figure 1B:
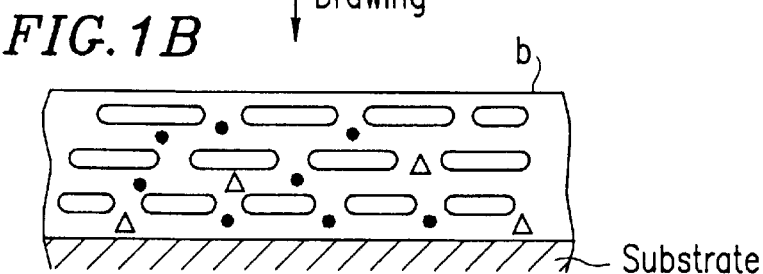
Figure 1C:
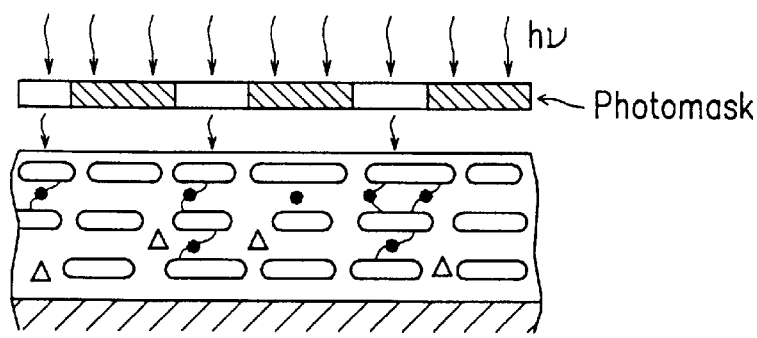
Figure 1D:
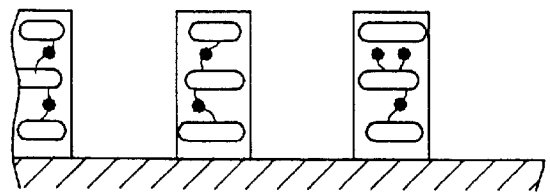

First, an original film a containing a photosensitive polymer, a photopolymerizable monomer and a photopolymerization initiator as shown in FIG. 1A is drawn to a uniaxial direction in a drawing process to obtain a drawn photosensitive film b. In the drawn photosensitive film b, as shown in FIG. 1B, molecules constituting the film are aligned in a uniaxial direction. Thus, the drawn photosensitive film has birefringence. As shown in FIG. 1C, when the drawn photosensitive film b is irradiated with light via a photomask or the like, a polymerization reaction is effected in a portion which is irradiated with light. By performing development using a predetermined developer (e.g., alkali solution), a negative pattern is formed corresponding to the irradiated portion, as shown in FIG. 1D. As seen from FIG. 1D, the molecules in the negative pattern portion maintain the uniaxial direction. Thus, the molecules in the negative pattern maintains birefringence of the film before the pattern formation.

A-2 Positive film

The positive photosensitive film of the present invention is formed of a composition containing a photodegradable polymer. The positive photosensitive film of the present invention can be formed of a composition containing a sensitizer and a polymeric material for retaining the sensitizer (hereinafter, referred to as a binder resin). Alternatively, the positive photosensitive film of the present invention can be formed of a composition containing a photodegrading agent and a binder resin.

The photodegradable polymer becomes a low molecular weight compound as a result of being degraded by light irradiation. In the present invention, any known photodegradable polymer can be used as the photodegradable polymer, but a polymer having a carbonyl group such as an ethylene-carbon monoxide copolymer, a vinyl chloride-carbon monoxide copolymer, and a polymer having an unsaturated bond such as polybutadiene or the like are typically used. The preferable photodegradable monomer is an ethylene-carbon monoxide copolymer, because it is particularly sensitive.

The sensitizer makes patterning possible by making solubility of a binder resin with respect to a developer in a light irradiated portion different from that in a non-irradiated portion. Specific examples of the sensitizer include naphthoquinone azide type compound, onium salt or the like. The sensitizer is contained in an amount of 0.01 to 50 parts by weight, and more preferably 0.1 to 10 parts by weight on the basis of 100 parts by weight of the binder resin.

The photodegrading agent makes patterning possible by oxidation-degradation causing the binder resin in the light irradiated portion to dissolve in a developer. Specific examples of the photodegrading agent include a compound having an unsaturated bond, for example, ketones such as benzophenone, anthraquinones, transition metal (e.g., Fe, Ni, Ca, Zn) salts of dithiocarbamic acid, olefins and terpenes. The amount of photodegrading agent is preferably 0.01 to 50 parts by weight, and more preferably 0.1 to 10 parts by weight on the basis of 100 parts by weight of the binder resin.

Examples of the binder resin include a novolak resin, a styrene-maleimide type copolymer and methyl methacrylate-methacrylic acid type copolymer or the like.

If necessary, a polymer for improving film formation and an intensifier for improving the image forming property during exposure can be further included.

The positive photosensitive film of the present invention can be produced in the same manner as the above-mentioned negative photosensitive film.

With reference to FIGS. 2A to 2D, the mechanism by which a photosensitive film of the present invention is patterned to an arbitrary pattern will be described. For simplicity, a film containing a sensitizer and a binder resin will only be described.

Figure 2A:
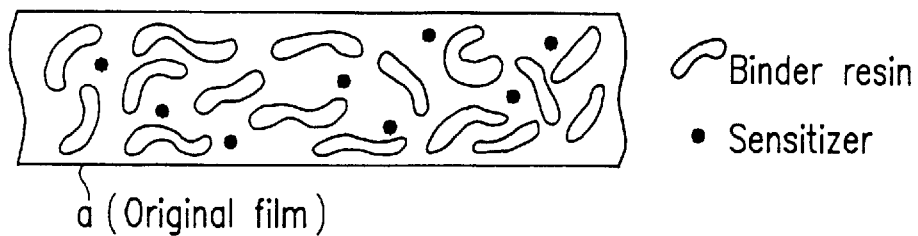
FIGS. 2A to 2D are schematic views illustrating pattern formation in a positive photosensitive film, an example of a photosensitive film of the present invention.
Figure 2B:
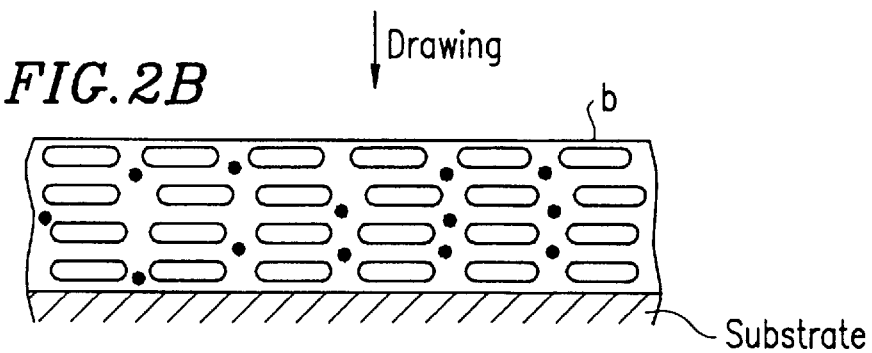
Figure 2C:
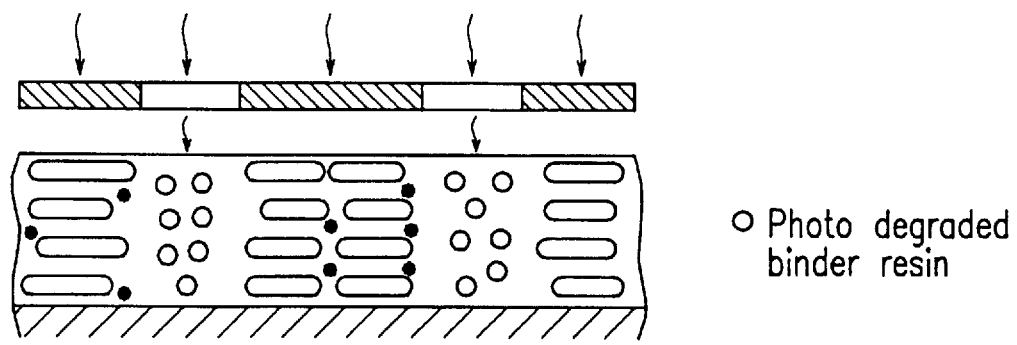
Figure 2D:
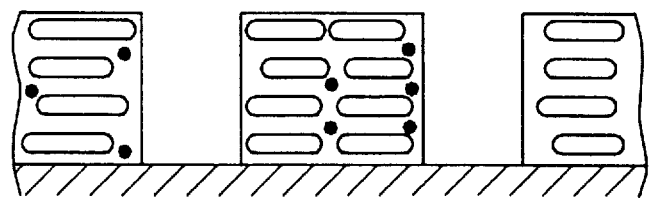

First, an original film a containing a sensitizer and a binder resin as shown in FIG. 2A is drawn to a uniaxial direction in a drawing process to obtain a drawn photosensitive film b. The drawn photosensitive film b has birefringence because molecules constituting the film are aligned in a uniaxial direction, as shown in FIG. 2B. As shown in FIG. 2C, when the drawn photosensitive film is irradiated with light via a photomask, solubility of the binder resin with respect to a developer in the irradiated portion is different from that in the non-irradiated portion (in this case, the binder resin in the irradiated portion is more soluble). Thus, by developing the film with a predetermined developer, a positive pattern is formed corresponding to the irradiated portions, as shown in FIG. 2D. As seen from FIG. 2D, the molecules in the positive pattern maintain the uniaxial direction. Thus, the molecules in the positive pattern maintains birefringence of the film before the pattern formation.

Although the case where the molecules are aligned in a uniaxial direction has been described for simplicity, the molecules of the photosensitive film of the present invention may be aligned in biaxial or triaxial directions or more. Even in such a case, the molecules have birefringence as well.

Next, the mechanism for patterning a polymer film of the present invention will be more specifically described by way of examples.

(1) Polymer having a carbonyl group:

It is known that, for polymers having a functional group including an unsaturated bond such as olefins, ketones (carbonyl group) and aromatics, photodegradation is effected by light irradiation. A polymer having a carbonyl group will be described for example.

In an ethylene-carbon monoxide copolymer, a Norrish reaction is effected by light irradiation (hν) to cause degradation, as shown in a reaction formula below. Thus, when the polymer having such a molecular structure is used, it is possible to pattern the polymer film by performing selective light irradiation and a developing process.

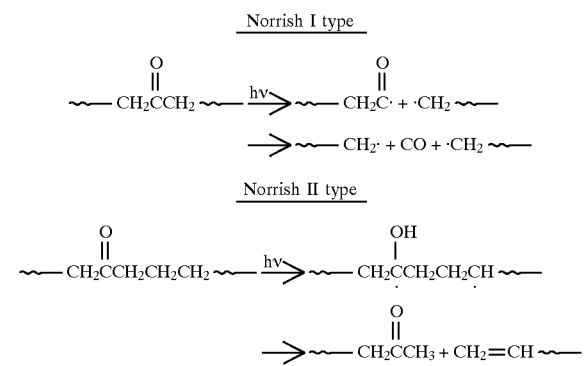

(2) Novolak resin and naphthoquinone diazide (NQD):

NQD, a sensitizer of a positive resist, releases nitrogen by light irradiation, and is converted to a ketene by a transition reaction. The ketene is reacted with water to generate indene carboxylic acid. The indene carbozylic acid is dissolved together with a novolak resin in an alkali solution which is a developer. On the other hand, in the non-irradiated portion, the NQD functions as dissolution inhibitor with respect to the novolak resin. As a result, a positive pattern is formed.

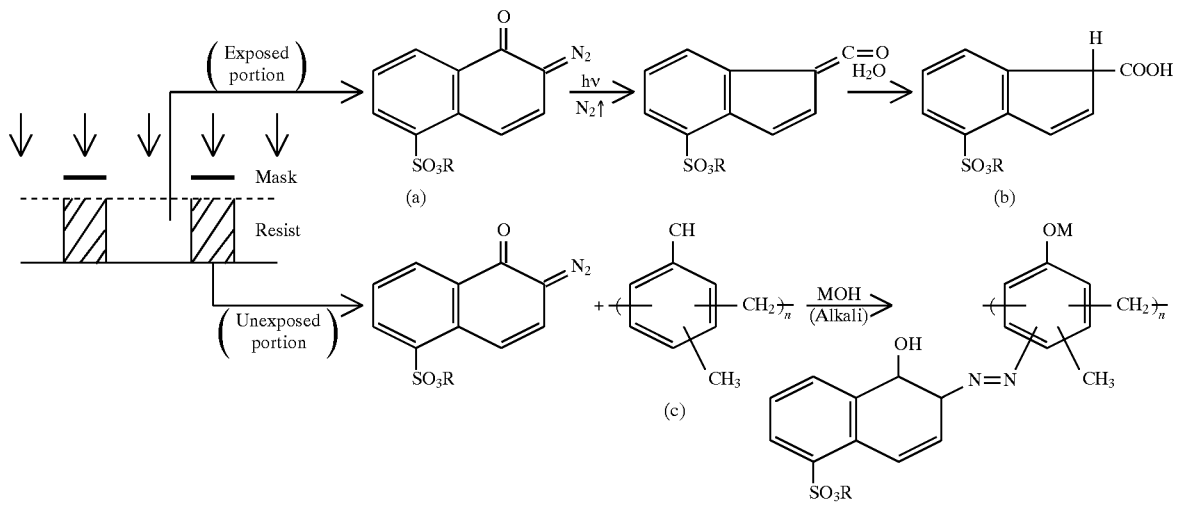

(a) Maphthoquinone diazide
(b) Indene carboxylic acid
(c) Novolak resin (3) Oxidation degradation of polymer:

The oxidation degradation reaction as described below proceeds in the light irradiated portion, to degrade a polymer. As a result, a positive pattern is formed.

Oxidation degradation of polymer

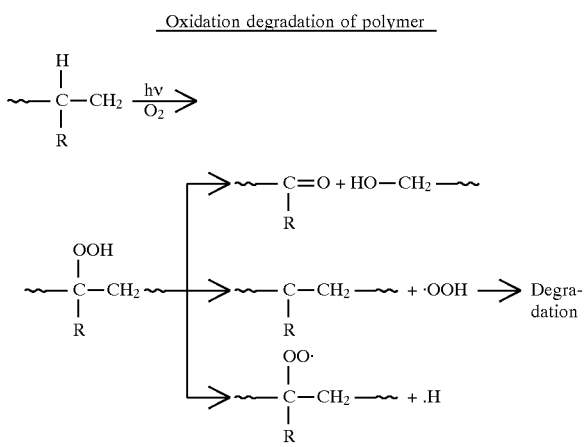

(4) Polymer containing ketones such as benzophenone and anthraquinones:

Ketones such as benzophenone and anthraquinones cause dehydrogenation of a polymer due to triplet photoexcitation. By this dehydrogenation reaction, oxidation degradation of the polymer proceeds in accordance with the following mechanism.

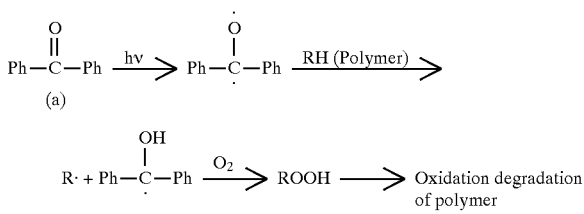

(a) Benzophenone (5) Polymer containing a transition metal compound:

A transition metal compound (typically, organic transition metallic compound) is thermally stable, but is easily degraded by light. In photodegradation of the transition metal compound, active radicals for oxidizing a polymer and metal ions for promoting degradation of peroxides are generated so that degradation of the polymer is significantly effected. As a typical example, a transition metal (e.g., Fe, Ni, Ca, Zn) salt of a dithiocarbamic acid is degraded in the following mechanism. As a result, the addition of an amount as small as about 0.01% of the transition metal salt of a dithiocarbamic acid causes significant degradation of the polymer.

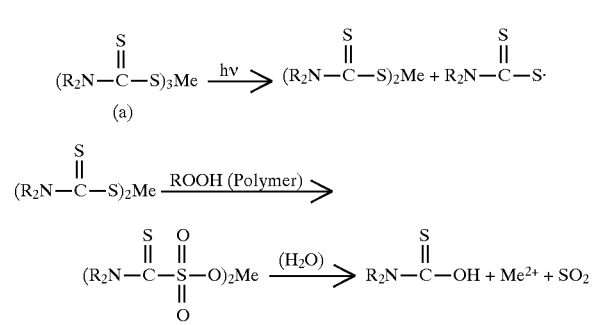

(a) Transition metal salt of dithiocarbamic acid
($Me^{2+}$) Metal ion (6) Polymer containing a compound having an unsaturated bond:

A compound having an unsaturated bond such as olefins and terpenes is reacted with oxygen by light irradiation in accordance with the following mechanism to form a peroxide group in the aryl position. By this peroxide group, oxidation degradation of the polymer proceeds.

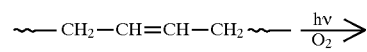

-continued

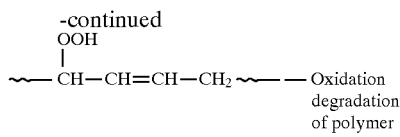
Oxidation degradation of polymer

The photosensitive film in the above description is different from a dry film used in producing a wiring pattern of a printed-wiring board or the photosensitive film used in producing a screen printing board described in Japanese Patent Publication No. 56-5761. More specifically, these photosensitive films are used to produce patterns on a film or sheet to which a liquid resist cannot be applied. These films have no birefringence because birefringence is not required in view of the purposes. On the other hand, the photosensitive film of the present invention has birefringence and thus has an excellent effect that, for example, display characteristics (brightness, hue or the like) are significantly improved in a liquid crystal display device.

B. Liquid crystal display device

Figure 3:
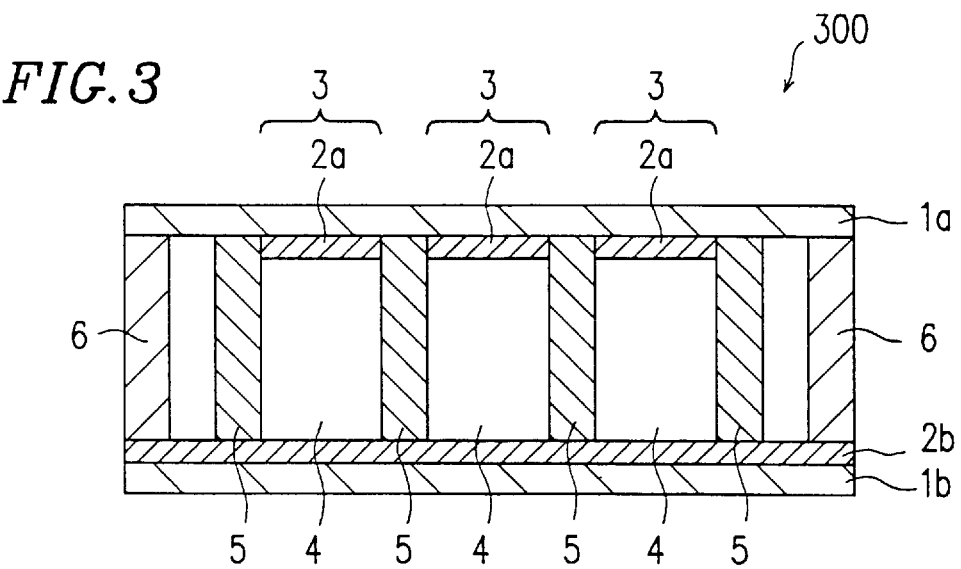
FIG. 3 is a schematic cross sectional view illustrating an exemplary liquid crystal display device of the present invention.

B-1 Liquid crystal display device including liquid crystal regions surrounded by a photosensitive film With reference to FIG. 3, a preferred example of a liquid crystal display device of the present invention will be described. FIG. 3 is a schematic cross sectional view of a liquid crystal display device 300.

The liquid crystal display device 300 includes a pair of substrates 1a and 1b opposing to each other and transparent electrodes 2a and 2b with a predetermined width provided with a predetermined gap on the substrates 2a and 2b. The stripe-shaped transparent electrodes 2a and 2b are disposed so as to cross each other (typically, substantially orthogonally). The portion where the transparent electrodes 2a and 2b overlap each other function as pixel regions 3 contributing to display. Furthermore, if necessary, an electrical insulator layer (not shown) may be provided so as to cover the transparent electrodes 2a and 2b, and an alignment layer (not shown) may be provided on the electrical insulator layer. Liquid crystal regions 4 corresponding to the pixel regions 3 are formed between the substrates 1a and 1b, and photosensitive films 5 having been subjected to exposure and development are disposed corresponding to non-pixel regions (i.e., surrounding the liquid crystal regions 4). The substrates 1a and 1b are attached to each other on the periphery with sealants 6. If necessary, spacers (not shown) may be disposed for the purpose of controlling the gap between the substrates.

The photosensitive film 5 is such a film as described above.

Examples of a material for the substrates 1a and 1b include known rigid materials such as glass, plastic or the like. A thickness of the substrates is preferably 0.2 mm to 2.0 mm. At least one of the substrates 1a and 1b is transparent. As long as one of the substrates is transparent, the other substrate can be provided with a metal layer which is not transparent.

ITO (Indium Tin Oxide), SnO or the like can be used for the transparent electrodes 2a and 2b. The transparent electrodes 2a and 2b are formed with a desired thickness on the substrates 1a and 1b by deposition, sputtering or the like, and patterned to a desired pattern by a known technique such as etching, photolithography or the like. The transparent electrodes 2a and 2b are formed in stripes with a predetermined width and gap, for example, by depositing ITO and performing etching. In this case, a width of the transparent electrodes is preferably 30 to 400 µm, a gap between the transparent electrodes is preferably 10 to 30 µm, and a thickness of transparent electrodes is preferably 300 to 4000 Å.

As for a liquid crystal material forming the liquid crystal regions 4, any known organic mixture can be used, as long as the mixture exhibits liquid crystal behavior at temperatures in the vicinity of room temperature. As the type of liquid crystal, nematic, cholesteric, smectic, ferroelectric and discotic liquid crystal are usable. These types of liquid crystal may be used singularly or in combination of two or more. As an operating mode, any of the known modes such as TN, STN, ECB, FLC, light scattering, axially symmetric alignment mode can be used. As the liquid crystal material, MLC-6069, ZLI-4427, ZLI-4792 (manufactured by Merck & Co., Inc.) can be used for example. A chiral agent can be added to the liquid crystal material, if necessary. The chiral agent can be preferably added in an amount of 0.1 to 15 parts by weight on the basis of 100 parts of the liquid crystal material.

Next, a preferred example of a method for producing the liquid crystal display device will be described.

First, the transparent electrodes 2a and 2b are formed with a predetermined width, gap and thickness on the substrates 1a and 1b. Then, an electrical insulator layer with a predetermined thickness is formed so as to cover the transparent electrodes 2a and 2b, if necessary. Moreover, an alignment layer with a predetermined thickness is formed so as to cover the electrical insulator layer, if necessary. The alignment layer is subjected to alignment treatment (e.g., rubbing treatment using a nylon fabric) so as to obtain a desired alignment state of the liquid crystal molecules of the liquid crystal regions 4.

Next, the photosensitive film 5 is attached to at least one of the substrates. The specific procedure is as follows.

First, at least one of the substrates 1a and/or 1b is preheated, if necessary. The preheating temperature is preferably 50° to 130° C., and the length of the preheating period is preferably 2 to 60 minutes. Then, the photosensitive film 5 is attached to the preheated substrate using heat and pressure. The temperature during attachment is preferably 60° to 130° C., and the pressure during attachment is preferably 1 to 10 kg/cm$^2$. In the case where the surface of the photosensitive film 5 is covered with a cover sheet, and the photosensitive film is wound onto a roll, the roll is fed at a predetermined rate (e.g., 1 to 2 m/min.), and the photosensitive film is attached while the cover sheet is being peeled off. Alternatively, the photosensitive film may be attached to the substrate by an adhesive, or thermosetting resin or photocurable resin.

Then, the photosensitive film attached to the substrate is irradiated with light (e.g., ultraviolet rays) having light intensity distribution using a photomask (i.e., is selectively irradiated with light). Typically, in the case where the photosensitive film is a positive film, the pixel regions are irradiated with light while non-pixel regions are irradiated with light in the case of a negative film. The irradiation amount can be varied depending on types of the film and a film thickness, but preferably 80 to 160 mJ/cm$^2$. After irradiation, the photosensitive film is developed with a suitable developer (e.g., 1% sodium carbonate solution). In the case where the photosensitive film has a base layer, the base layer is peeled off after irradiation, and then development is performed. The type of the developer and development conditions can be varied depending on the types of the film and a film thickness, but can be selected among ordinary developers and developing conditions. Thus, a photosensitive film is formed in a matrix in the non-pixel regions.

Then, a liquid crystal material is dropped on the substrate on which the photosensitive film is disposed. Then, the substrates 1a and 1b are attached to each other on the periphery with sealants 6 so that the transparent electrodes 2a and 2b cross each other (e.g., orthogonally cross each other) when seen from the normal direction of the substrates 1a and 1b. Spacers can be distributed in a suitable amount for the purpose of controlling the substrate gap before the material is dropped, if necessary.

B-2 Liquid crystal display device including the photosensitive film formed in stripes Another preferred example of the liquid crystal display device of the present invention will be described. The liquid crystal display device is the same as the liquid crystal display device of B-1, except that the photosensitive film 5 is formed in stripes along a longitudinal direction of the device. In this liquid crystal display device, it is possible to perform vacuum injection of a liquid crystal material during production and therefore producibility is significantly improved.

Hereinafter, only requirements characteristic of this liquid crystal display device will be described (the requirements not specifically described are the same as in the case of B-1).

For example, in the case of a negative film, in irradiating the photosensitive film with light, only a portion where the transparent electrodes are not formed is irradiated with light. As a result, a photosensitive film is formed in stripes in the portion where the transparent electrodes are not formed.

Figure 4:
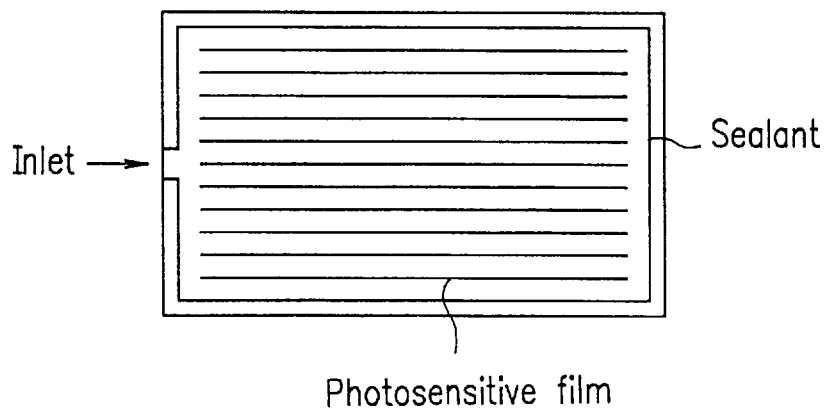
FIG. 4 is a schematic view illustrating the position relationship between a pattern of a photosensitive film and a pattern of a sealant in an exemplary liquid crystal display device of the present invention.

In attaching the substrates with a sealant, it is possible to perform vacuum injection of a liquid crystal material, for example, by patterning the photosensitive film and the sealant as described in FIG. 4. The vacuum injection of the liquid crystal material can be performed by a known method.

Figure 5:
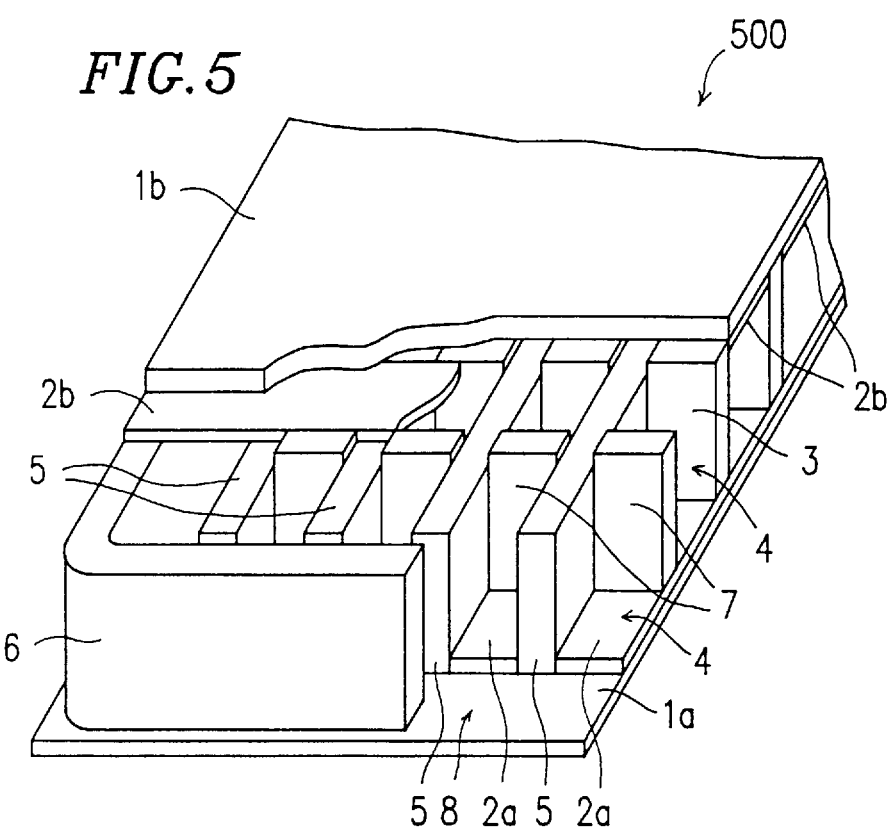
FIG. 5 is a schematic perspective view illustrating another exemplary liquid crystal display device of the present invention.

B-3 Liquid crystal display device including liquid crystal regions surrounded by a polymeric portion and the photosensitive film With reference to FIG. 5, another preferred example of the liquid crystal display device of the present invention will be described. FIG. 5 is a schematic perspective view of this liquid crystal display device. The liquid crystal display device 500 includes photosensitive films 5 disposed in stripes, polymeric portions 7 formed by phase separation between a liquid crystal material and a polymerizable material and liquid crystal regions 4 surrounded by the photosensitive films 5 and the polymeric portions 7. Herein, a simple matrix type liquid crystal display device will be described below.

The liquid crystal display device 500 includes a pair of substrates 1a and 1b opposing to each other and transparent electrodes 2a and 2b with a predetermined width provided with a predetermined gap on the substrates 1a and 1b. The transparent electrodes 2a are formed in stripes along the longitudinal direction on the substrate 1a. The transparent electrodes 2b are formed in stripes along the direction perpendicular to the longitudinal direction on the substrate 1b. The portions where the transparent electrodes 2a and 2b overlap each other function as pixel regions 3 contributing to display. Furthermore, if necessary, an electrical insulator layer (not shown) may be provided so as to cover the transparent electrodes 2a and 2b, and an alignment layer (not shown) may be provided on the electrical insulator layer. Liquid crystal regions 4 corresponding to the pixel regions 3 are formed between the substrates 1a and 1b.

A photosensitive films 5 having been subjected to exposure and development are disposed corresponding to the portions on the substrate 1a where the transparent electrodes 2a are not formed. Furthermore, the polymeric portions 7 are formed so as to surround the liquid crystal regions 4 in cooperation with the photosensitive films 5.

The substrates 1a and 1b are attached to each other on the periphery with sealants 6. If necessary, spacers (not shown) may be disposed for the purpose of controlling the gap between the substrates.

The polymeric portions 7 include polymeric walls, polymeric pillars, polymeric projections and the like. For simplicity, the polymeric walls will be only described herein. As a polymerizable material for forming the polymeric walls 7, any compound can be used, provided that it is polymerized and cured by light irradiation. Specific examples of such a polymerizable material include R-684 (manufactured by Nippon Kayaku Co., Ltd.), p-phenyl styrene, isobornyl methacrylate, perfluoromethacrylate or the like. The polymerizable material can be singularly or in combination of two or more. Furthermore, the polymerizable material can contain a polymerization initiator, if necessary. Examples of the polymerization initiator include Irgacure 651 (manufactured by Chiba-Geigy Corporation).

The details of components of the liquid crystal display device 500 other than the polymeric walls 7 are the same as the liquid crystal display device of B-1.

Next, a preferred example of a method for producing the liquid crystal display device will be described.

First, the transparent electrodes 2a and 2b are formed with a predetermined width, gap and thickness on the substrates 1a and 1b. The transparent electrodes 2a are formed along the longitudinal direction of the substrate 1a, and the transparent electrodes 2b are formed along the direction perpendicular to the longitudinal direction of the substrate 1b. Then, an electrical insulator layer with a predetermined thickness is formed so as to cover the transparent electrodes 2a and 2b, if necessary. Moreover, an alignment layer with a predetermined thickness is formed so as to cover the electrical insulator layer, if necessary. The alignment layer is subjected to alignment treatment (e.g., rubbing treatment using a nylon fabric) so as to obtain a desired alignment state of the liquid crystal molecules of the liquid crystal regions 4.

Next, the photosensitive film 5 is attached to the substrate 1a. The specific procedure is as follows.

First, the substrate 1a is preheated, if necessary. The preheating temperature is preferably 50° to 130° C., and the length of the preheating period is preferably 2 to 60 minutes. Then, the photosensitive film 5 is attached to the preheated substrate 1a using heat and pressure. The temperature during attachment is preferably 60 to 130° C., and the pressure during attachment is preferably 1 to 10 kg/cm$^2$. In the case where the surface of the photosensitive film 5 is covered with a cover sheet, and the photosensitive film is wound onto a roll, the roll is fed at a predetermined rate (e.g., 1 to 2 m/min.), and the photosensitive film is being attached to the substrate while the cover sheet is being peeled off. Alternatively, the photosensitive film may be attached to the substrate by an adhesive, or thermosetting resin or photocurable resin.

Then, the photosensitive film attached to the substrate 1a is irradiated with light (e.g., ultraviolet rays) having light intensity distribution using a photomask (i.e., is selectively irradiated with light). Typically, in the case where the photosensitive film is a negative film, the portions on the substrate 1a where the transparent electrode are formed are irradiated with ultraviolet rays. The irradiation amount can be varied depending on types of the film and a film thickness, but is preferably 80 to 160 mJ/cm$^2$. After irradiation, the photosensitive film is developed with a suitable developer (e.g., 1% sodium carbonate solution). In the case where the photosensitive film has a base layer, the base layer is peeled off after irradiation, and then development is performed. The type of the developer and development conditions can be varied depending on the types of the film and a film thickness, but can also be selected among ordinary developers and developing conditions. Thus, a photosensitive film is formed in stripes in the portions on the substrate 1a where the transparent electrodes are not formed.

Then, the substrates 1a and 1b are attached to each other on the periphery via sealants 6 so that the transparent electrodes 2a and 2b orthogonally cross each other when seen from the normal direction of the substrates 1a and 1b (i.e., the longitudinal directions of the substrates 1a and 1b are matched). Spacers can be distributed in a suitable amount for the purpose of controlling the substrate gap before the material is dropped, if necessary.

For simplicity, the case where the photosensitive film is attached to the substrate 1a has been described. However, as long as an inlet 8 and the photosensitive film 5 are disposed in such a manner as shown in FIG. 5, the photosensitive film can be formed and the substrates can be attached to each other by a procedure different from the above-mentioned procedure (e.g., the photosensitive film can be formed on the substrate 1b).

Then, a mixture of a liquid crystal material and a polymerizable material is injected between the attached substrates from the inlet 8 to obtain a liquid crystal cell. The inlet 8 is sealed with an ultraviolet-curable resin, a two-component curable resin or the like (in the case where the inlet 8 is sealed with an ultraviolet-curable resin, it is desirable that the inlet is irradiated without irradiating the pixel regions of the substrates). Then, the polymeric portions 7 are formed by causing phase separation between the liquid crystal material and the polymerizable material. A specific procedure of the phase separation is as follows.

Then, a desired portion (a portion where the photosensitive film is not formed in the non-pixel regions in this case) of the obtained liquid crystal cell is selectively irradiated with ultraviolet rays (i.e., transmittance amount distribution of ultraviolet rays is selectively generated). Examples of a light source of ultraviolet rays include a high pressure mercury lamp for ultraviolet ray irradiation by which collimated light can be obtained. Examples of a method for selectively irradiating ultraviolet rays include a method using a photomask, a method for absorbing ultraviolet rays by a metal layer, an inorganic layer or an organic layer, a self alignment method using the transparent electrodes as a mask or the like. In the case where a photomask is used, for example, the liquid crystal cell is irradiated with ultraviolet rays via a photomask shielding the pixel regions and the portion where the photosensitive film is formed from light. The illuminance of the ultraviolet rays is preferably 3 to 30 mW/cm$^2$, and the irradiation period of time is preferably 30 to 360 seconds. Thus, by selectively generating energy intensity distribution by selective irradiation of the ultraviolet rays, the liquid crystal material and the polymerizable material are phase-separated to form the liquid crystal regions 4 and the polymeric walls 7.

The ultraviolet ray irradiation can be performed at room temperature, or at a high temperature at which the liquid crystal material exhibits an isotropic state. This temperature can be varied depending on types of the liquid crystal material, but is preferably 80° to 120° C. It is preferable to perform ultraviolet ray irradiation at a high temperature at which the liquid crystal material exhibits an isotropic state. In this case, the polymerizable material is polymerized in a state where the liquid crystal material and the polymerizable material have significantly large mobilities. Thus, the phase separation between the liquid crystal material and the polymerizable material is distinct. As a result, the alignment of the liquid crystal molecules in the liquid crystal regions becomes significantly stable.

In the case where ultraviolet ray irradiation is performed at a high temperature, the liquid crystal cell is gradually cooled to room temperature (about 25° C.) after ultraviolet ray irradiation. The cooling rate is preferably 3° C./h to 20° C./h, and more preferably 5° C./h to 10° C./h.

Preferably, the liquid crystal cell irradiated with ultraviolet rays is irradiated again with ultraviolet rays to substantially completely polymerize the polymerizable material remaining unpolymerized. This procedure makes it possible to obtain the liquid crystal regions and the polymeric walls as a result of significantly satisfactory phase separation between the liquid crystal material and the polymerizable material.

More preferably, the liquid crystal cell is again heated to a high temperature at which the liquid crystal material exhibits an isotropic state, heated continuously for 30 minutes or more, and then cooled in the same manner as described above. By repeating heating and slow cooling, the alignment of the liquid crystal molecules in the liquid crystal regions is further stabilized.

B-4 Liquid crystal display device including liquid crystal regions surrounded by polymeric portions A simple matrix type liquid crystal display device including liquid crystal regions and polymeric portions surrounding the liquid crystal regions will be described as another preferred example of the liquid crystal display device of the present invention. FIG. 6A is a schematic perspective view. FIG. 6B is a schematic cross sectional view of the liquid crystal display device in FIG. 6A.

The liquid crystal display device 600 includes a photosensitive film 5 having birefringence in a predetermined pattern (e.g., a pattern corresponding to non-pixel regions 12). The photosensitive film 5 can be provided on the face on the liquid crystal region side of the substrate, or can be provided on the outer face of the substrate (FIGS. 6A and 6B show the case where the photosensitive film is provided on the outer face of the substrate). Preferably, the photosensitive film 5 is provided on the face on the liquid crystal region side of the substrate. This is because parallax is reduced and thus a liquid crystal display device having more excellent visibility can be obtained.

The liquid crystal display device 600 includes a pair of substrates 1a and 1b opposing to each other and transparent electrodes 2a and 2b with a predetermined width provided with a predetermined gap on the substrates 1a and 1b. The stripe-shaped transparent electrodes 2a and 2b are disposed so as to cross each other. The portions where the transparent electrodes 2a and 2b overlap each other function as pixel regions 3 contributing to display. Furthermore, if necessary, electrical insulator layers 9a and 9b may be provided so as to cover the transparent electrodes 2a and 2b, and alignment layers 10a and 10b may be provided on the electrical insulator layers 9a and 9b. Liquid crystal regions 4 corresponding to the pixel regions 3 and polymeric portions 7 (herein, polymeric walls surrounding the liquid crystal regions) corresponding to non-pixel regions 12 are interposed between the substrates 1a and 1b. The substrates 1a and 1b are attached to each other on the periphery with sealants 6. Spacers 11 are disposed between substrates 1a and 1b for the purpose of controlling the gap between the substrates.

The details of components of the liquid crystal display device 600 are the same as the liquid crystal display devices of B-1 and B-3.

Next, a preferred example of a method for producing the liquid crystal display device will be described.

First, the transparent electrodes 2a and 2b are formed with a predetermined width, gap and thickness on the substrates 1a and 1b. Then, electrical insulator layers 9a and 9b with a predetermined thickness are formed so as to cover the transparent electrodes 2a and 2b. Then, alignment layers 10a and 10b with a predetermined thickness are formed so as to cover the electrical insulator layers 9a and 9b. The alignment layers are subjected to alignment treatment (e.g., rubbing treatment using a nylon fabric) so as to obtain a desired alignment state of the liquid crystal molecules of the liquid crystal regions 4. Then, spacers 11 can be distributed in a suitable amount on the alignment layer 10a, and the substrates 1a and 1b are attached to each other on the periphery via sealants 6 so that the stripe-shaped transparent electrodes 2a and 2b orthogonally cross each other when seen from the normal direction of the substrates 1a and 1b. Then, a mixture of a liquid crystal material and a polymerizable material is injected between the attached substrates by a known method to obtain a liquid crystal cell. The inlet is sealed with an ultraviolet-curable resin, a two-component curable resin or the like (in the case where the inlet is sealed with an ultraviolet-curable resin, it is desirable that the inlet is irradiated without irradiating the pixel regions of the substrates).

Then, a desired portion (typically, the non-pixel regions) in the obtained liquid crystal cell is selectively irradiated with ultraviolet rays (i.e., transmittance amount distribution of ultraviolet rays is selectively generated). Examples of a light source of ultraviolet rays include a high pressure mercury lamp for ultraviolet ray irradiation by which collimated light can be obtained. Examples of a method for selectively irradiating ultraviolet rays include a method using a photomask, a method for absorbing ultraviolet rays by a metal layer, an inorganic layer or an organic layer, a self alignment method using the transparent electrodes as a mask or the like. In the case where a photomask is used, for example, the liquid crystal cell is irradiated with ultraviolet rays via a photomask having a matrix pattern shielding the pixel regions from light. The illuminance of the ultraviolet rays is preferably 3 to 30 mW/cm$^2$, and the length of the irradiation period is preferably 30 to 360 seconds. Thus, by selectively generating energy intensity distribution by selective irradiation of the ultraviolet rays, the liquid crystal material and the polymerizable material are phase-separated to form the liquid crystal regions 4 and the polymeric walls 7.

The ultraviolet ray irradiation can be performed at room temperature, or at a high temperature at which the liquid crystal material exhibits an isotropic state. This temperature can be varied depending on types of the liquid crystal material, but is preferably 80° to 120° C. It is preferable to perform ultraviolet ray irradiation at a high temperature at which the liquid crystal material exhibits an isotropic state. In this case, the polymerizable material is polymerized in a state where the liquid crystal material and the polymerizable material have significantly large mobilities. Thus, the phase separation between the liquid crystal material and the polymerizable material is distinct. As a result, the alignment of the liquid crystal molecules in the liquid crystal regions becomes significantly stable.

In the case where ultraviolet ray irradiation is performed at a high temperature, the liquid crystal cell is gradually cooled to room temperature (about 25° C.) after ultraviolet ray irradiation. The cooling rate is preferably 3° C./h to 20° C./h, and more preferably 5° C./h to 10° C./h.

Preferably, the liquid crystal cell irradiated with ultraviolet rays is irradiated again with ultraviolet rays to substantially completely polymerize the polymerizable material remaining unpolymerized. This procedure makes it possible to obtain the liquid crystal regions and the polymeric walls as a result of significantly satisfactory phase separation between the liquid crystal material and the polymerizable material.

More preferably, the liquid crystal cell is again heated to a high temperature at which the liquid crystal material exhibits an isotropic state, and continuously heated for 30 minutes or more, and then gradually cooled in the same manner as described above. By repeating heating and slow cooling, the alignment of the liquid crystal molecules in the liquid crystal regions is further stabilized.

The photosensitive film 5 is attached to the liquid crystal cell provided with the liquid crystal regions 4 and the polymeric walls 7 to obtain the liquid crystal display device 600. A specific procedure is as follows.

First, the substrate 1a and/or 1b is preheated, if necessary. The preheating temperature is preferably 50° to 130° C., and the length of the preheating period is preferably 2 to 60 minutes. Then, the photosensitive film 5 is attached to the preheated substrate using heat and pressure. The temperature during attachment is preferably 60° to 130° C., and the pressure during attachment is preferably 1 to 10 kg/cm$^2$. In the case where the surface of the photosensitive film 5 is covered with a cover sheet, and the photosensitive film is wound onto a roll, the roll is fed at a predetermined rate, and the photosensitive film is being attached to the substrate while the cover sheet is being peeled off. Alternatively, the photosensitive film may be attached to the substrate by an adhesive, or polymerizable resin.

Then, the photosensitive film attached to the substrate is irradiated with light having light intensity distribution using a photomask (i.e., selectively irradiated with light). In the case where the photosensitive film is a positive film, the pixel regions 3 are irradiated with light. In the case where the photosensitive film is a negative film, the non-pixel regions 12 are irradiated with light. The irradiation amount can be varied depending on types of the film and a film thickness, but preferably 0.5 to 100 mJ/cm$^2$. After irradiation the photosensitive film is developed with a suitable developer (e.g., 1% sodium carbonate solution). The type of the developer and development conditions can be varied depending on the types of the film and a film thickness, but can be selected among ordinary developers and developing conditions.

In the case where the photosensitive film is disposed on the face on the liquid crystal region side of the substrate, first, the photosensitive film 5 is attached to the substrates 1a and/or 1b provided with the transparent electrodes 2a and/or 2b, and selectively irradiated with light, and developed. In the case where the electrical insulator layers 9a and/or 9b, and the alignment layers 10a and/or 10b are further provided on the transparent electrodes 2a and 2b, the photosensitive film 5 is attached to the alignment layers 10a and/or 10b, and selectively irradiated with light and developed. The subsequent procedure is the same as described above except that the photosensitive film is not attached to the outer face of the substrate.

Preferably, a retardation value of the photosensitive film disposed in the thus produced liquid crystal display device is set such that the hue of the liquid crystal display device under application of no voltage is most close to white in a normally white system.

Although the liquid crystal display device displaying by simple matrix driving has been described as an example of the liquid crystal display device of the present invention, the present invention is not limited to this example. Namely, the present invention can be applied to, for example, liquid crystal display devices displaying by active driving using TFTs (thin film transistors), MIM (Metal Insulator Metal) or the like. Furthermore, the present invention can be applied to the liquid crystal display device performing color display by forming color filters and a black matrix. As for operating modes, the present invention can be applied to any modes (e.g., STN mode, axially symmetric alignment mode), provided that it is a known operating mode of the liquid crystal display device. Furthermore, the present invention can be applied to both a transmissive liquid crystal display device and a reflective liquid crystal display device.

Furthermore, although the liquid crystal display device where pixels are disposed in a matrix has been described for simplicity, the present invention can be applied to a liquid crystal display device regardless of the shape and arrangement of the pixels. For example, the present invention can be applied to a liquid crystal display device where pixels are arranged in a delta, a liquid crystal display device where the shape of pixels is a square or rectangle or the like.

The liquid crystal display device can be suitably used in a plane display device such as a personal computer, display for a liquid crystal television, a portable information terminal or the like.

According to the present invention, a photosensitive film having birefringence can be provided. Birefringence can be obtained by drawing a photosensitive film to align polymer molecules constituting the photosensitive film in a predetermined direction.

The photosensitive film of the present invention can be either negative or positive. A negative photosensitive film is formed of a mixture containing a photosensitive polymer, a photopolymerizable monomer and a photopolymerization initiator. In the negative film, the photosensitive polymer and the photopolymerizable monomer are subjected to a polymerization reaction in a light irradiated portion so that a portion insoluble to a developer is formed, thus making a desired patterning possible. A positive photosensitive film is formed of a composition containing a photodegradable polymer. The positive photosensitive film of the present invention is also formed of a composition containing a sensitizer and a binder resin. Alternatively, the positive photosensitive film of the present invention is formed of a composition containing a photodegrading agent and a binder resin. In the positive film, the photodegradable polymer or the binder resin is subjected to photodegradation reaction in a light irradiated portion so that a portion soluble to a developer is formed, thus making a desired patterning possible.

It is possible to selectively form regions having birefringence in a desired position by using a photosensitive film having birefringence. As a result, a variety of advantages in a liquid crystal display device can be obtained as follows.

(A) The photosensitive film is formed so as to surround at least one pixel so that a pair of substrates are supported in a wider area than spacers. As a result, the strength (e.g., pressure resistance, impact resistance) of the liquid crystal display device is significantly improved.

(B) The photosensitive films are formed in stripes so that it becomes easy to inject a liquid crystal material during production. As a result, it becomes possible to minimize an amount of a liquid crystal material necessary to produce a liquid crystal display device, thus improving producibility of the liquid crystal display device. In addition, in this liquid crystal display device, the substrates are supported in a wider area than spacers, thus maintaining excellent strength.

(C) The adjacent striped photosensitive films and polymeric portions formed by phase separation surround at least one pixel so that it becomes possible to support the substrates in a much wider area, thus obtaining a stronger liquid crystal display device. In addition, in this liquid crystal display device, ease of injecting a liquid crystal material during production is maintained, thus being excellent in producibility.

(D) The photosensitive film contains spacers so that the substrates are supported by both the photosensitive film and the spacers, thus further improving the strength of the liquid crystal display device. In addition, since the spacers can be disposed only in a portion where the photosensitive film is formed, it is possible to reduce the disturbance in the alignment of the liquid crystal molecules by the spacers and obtain a liquid crystal display device having excellent display characteristics.

(E) A predetermined retardation value (preferably, in the range from 90 nm to 800 nm) is provided by controlling the alignment of polymer molecules constituting the film so that it is possible to compensate hue of visible light used for display. As a result, hue compensation for the liquid crystal display device (e.g., an STN type liquid crystal display device) can be effectively performed.

(F) In the liquid crystal display device including a polymeric portions surrounding liquid crystal regions, it is possible to compensate hue of the polymeric portions by disposing the photosensitive film so as to correspond to the polymeric portions. As a result, it is possible to reduce the deterioration in brightness of the liquid crystal display device due to the optically isotropic polymeric portions. Furthermore, it is possible to reduce parallax due to the thickness of the substrate by forming the photosensitive film on the face on the liquid crystal region side of the substrate and obtain a liquid crystal display device having high visibility.

(G) Since the photosensitive film is attached to the substrate using heat and pressure, the photosensitive film has an excellent adhesion to the substrate and can be attached to the substrate having a large area at one time. Thus, a method for producing a liquid crystal display device excellent in producibility can be provided.

EXAMPLES p Hereinafter, the present invention will be specifically described way by of examples, but the present invention is not limited to these examples.

Example 1

NIT 215 (manufactured by Nippon Synthetic Chemical Co., Ltd.) was used as a dry film including a cover layer and a base layer. The dry film was preheated at 90° C. and then drawn at a drawing ratio of 2.5 to the TD direction by a tenter. During the drawing process, the temperature in the tenter was maintained at 90° C. Thereafter, the film was allowed to pass through a heating zone at 200° C. for one hour and a cooling zone at 100° C. for one hour.

After the cover layer and the base layer of the obtained drawn film were peeled off, the film was interposed between two polarizing plates disposed in a crossed Nicol state and then observed. Then, it was found out that the two polarizing plates with the film therebetween transmit light in a larger amount than two polarizing plates without the film therebetween. This result shows that the drawn film has retardation (birefringence).

The retardation value of this drawn film was measured by an automated birefringence meter (KOBRA-21ADH, manufactured by New Oji Paper Co., Ltd.). The retardation value was 420 nm.

After the film was selectively irradiated with ultraviolet rays via a photomask, the film was subjected to a developing process. Irradiation and development conditions were ordinary conditions. As a result, a negative resin pattern was formed. This reveals that the drawn film has photosensitivity.

Example 2

A photosensitive polymer was obtained by the following procedure. First, m-xylylene diisocyanate was added in an equivalent amount to poly(vinyl alcohol) (weight average molecular weight $1\times10^5$). The mixture was stirred at 60° C. to 90° C. so as to allow the reaction to proceed, and 2-hydroxyethyl acrylate was added in an amount of 2.5 moles on the basis of one mole of the reaction product at the time when the residual isocyanate group reaches 2.2% by weight. Then, the mixture was stirred at 60° C. for 9 hours. When the isocyanate group was left in an amount of 0.4% by weight, the reaction was allowed to stop. Then, hexamethylenediol diacrylate as a photosensitive monomer and Irgacure 651 (manufactured by Chiba-Geigy Corporation) as a photopolymerization initiator were added in an amount of 10 parts by weight and 0.5 parts by weight, respectively, on the basis of 100 parts by weight of the reaction product. Then, the mixture was stirred at 230° C. for 2 hours. Thus, a photosensitive polymer was obtained.

The obtained photosensitive polymer was formed into a film by a T die casting method (casting temperature: 230° C.) to obtain an original film.

Next, this original film was preheated at 100° C. for 30 min. and then drawn at a drawing ratio of 4.6 to the TD direction at 100° C. by a tenter. Next, the film was allowed to pass through a heating zone at 200° C. and a cooling zone at 100° C. In this case, the length of time required in the heating zone was 1.3 times the length of the period for the drawing process. The length of time required in the cooling zone was 0.6 times.

The obtained drawn film was interposed between two polarizing plates disposed in a crossed Nicol state, and then observed. It was found that the two polarizing plates with the film therebetween transmit light in a larger amount than two polarizing plates without the film therebetween. This result shows that the drawn film has retardation (birefringence).

The retardation value of this drawn film was measured by an automated birefringence meter (KOBRA-21ADH, manufactured by New Oji Paper Co., Ltd.). The retardation value was 480 nm.

After the film was selectively irradiated with ultraviolet rays via a photomask, the film was subjected to a developing process. Irradiation and development conditions were ordinary conditions. As a result, a negative resin pattern was formed. This reveals that the drawn film has photosensitivity.

Example 3

A photodegradable polymer, an ethylene-carbon monoxide copolymer (weight average molecular weight $1.5\times10^5$), was formed into a film by a T die casting method (casting temperature: 230° C.) to obtain an original film.

Next, this original film was preheated at 100° C. for 20 min. and then drawn at a drawing ratio of 4.6 to the TD direction at 100° C. by a tenter. Next, the film was allowed to pass through a heating zone at 200° C. and a cooling zone at 100° C. In this case, the length of the time required in the heating zone was 1.3 times the length of the period for the drawing process. The length of time required in the cooling zone was 0.6 times.

The obtained drawn film was interposed between two polarizing plates disposed in a crossed Nicol state, and the observation was conducted. Then, it was found out that the two polarizing plates with the film therebetween transmit light in a larger amount than two polarizing plates without the film therebetween. This result shows that the drawn film has retardation (birefringence).

The retardation value of this drawn film was measured by an automated birefringence meter (KOBRA-21ADH, manufactured by New Oji Paper Co., Ltd.). The retardation value was 500 nm.

After the film was selectively irradiated with ultraviolet rays via a photomask, the film was subjected to a developing process. Irradiation and development conditions were ordinary conditions. As a result, a positive resin pattern was formed. This reveals that the drawn film has photosensitivity.

Example 4

Benzophenone was added as a photodegrading agent in an amount of 2 parts by weight on the basis of 100 parts by weight of polyethylene terephthalate (average molecular weight: $1.2\times10^5$). The mixture was heated and kneaded at 230° C. for 60 minutes. The kneaded product was formed into a film by a T die casting method (casting temperature: 260° C.) to obtain an original film.

Next, this original film was preheated at 100° C. for 30 min. and then drawn at a drawing ratio of 4.3 to the TD direction at 100° C. by a tenter. Next, the film was allowed to pass through a heating zone at 200° C. and a cooling zone at 100° C. In this case, the length of time required in the heating zone was 1.3 times the length of the period for the drawing process. The length of the time required in the cooling zone was 0.6 times.

The obtained drawn film was interposed between two polarizing plates disposed in a crossed Nicol state, and then observed. It was found that the two polarizing plates with the film therebetween transmit light in a larger amount than two polarizing plates without the film therebetween. This result shows that the drawn film has retardation (birefringence).

The retardation value of this drawn film was measured by an automated birefringence meter (KOBRA-21ADH, manufactured by New Oji Paper Co., Ltd.). The retardation value was 530 nm.

After the film was selectively irradiated with ultraviolet rays via a photomask, the film was subjected to a developing process. Irradiation and development conditions were ordinary conditions. As a result, a positive resin pattern was formed. This reveals that the drawn film has photosensitivity.

Example 5

A liquid crystal display device described at B-2 was produced by the following procedure.

An ITO layer was deposited with a thickness of 700 Å on a pair of substrates (7059 glass manufactured by Corning Inc.) by sputtering and patterned to form striped transparent electrodes with a width of 280 μm and a gap of 20 μm. Furthermore, an electrical insulator layer made of $SiO_2$ was formed with a thickness of 1000 Å by sputtering so as to cover the transparent electrodes. Furthermore, an alignment layer made of a polyimide resin was formed with a thickness of 800 Å by flexography. Then, the substrates were subjected to a rubbing treatment with a nylon fabric so that liquid crystal molecules were in a predetermined alignment state when the substrates were attached to each other so that the respective transparent electrodes crossed each other.

On the other hand, a photosensitive film (retardation value: 480 nm) was produced in the same manner as in Example 2 except that spacers with a diameter of 4.5 μm were added. A cover layer of polyethylene terephthalate was provided on one face of the film in order to improve manipulability, and then the film was wound onto a roll. This film was attached to the substrate by the following procedure.

The substrate was preheated at 60° C. for 10 minutes. Then, the obtained roll was fed at a rate of 1.5 m/min. while the cover layer of the roll was being peeled off. Thus, the photosensitive film was attached to the substrate at a temperature of 80° C. and a pressure of 4 kg/cm$^2$.

The attached photosensitive film was irradiated with ultraviolet rays at 120 mJ/cm$^2$ via a photomask shielding a portion where the transparent electrodes were formed from light (i.e., the portion where the transparent electrodes were not formed was selectively irradiated with ultraviolet rays). Next, a developing treatment was performed using a 1% sodium carbonate solution. Thus, the photosensitive film was formed in stripes in the portion where the transparent electrodes were not formed on the substrate.

The substrate where the photosensitive film was formed was attached to the other substrate on the periphery with a sealant so that the respective transparent electrodes crossed each other. The photosensitive film and the sealant were positioned as shown in FIG. 4. Namely, the photosensitive films were provided in stripes parallel to the direction of the flow of a liquid crystal material injected from an inlet (a portion where the sealant was not formed).

A liquid crystal material was injected at about 30° C. between the attached substrates by a known method to produce a liquid crystal cell. As the liquid crystal material, MLC-6069 (manufactured by Merck & Co., Inc.) including 0.3% of a chiral agent (S-811) was used.

When the cell gap of the thus produced liquid crystal cell was measured, the result was an average of 4.4 μm, 3σ=0.09 μm. When the liquid crystal cell was pressed at a pressure of 200 g/mmφ by a metal rod with an end diameter of 1 mmφ, unsatisfactory alignment of liquid crystal molecules due to a change in the cell gap was not observed.

Figure 7A:
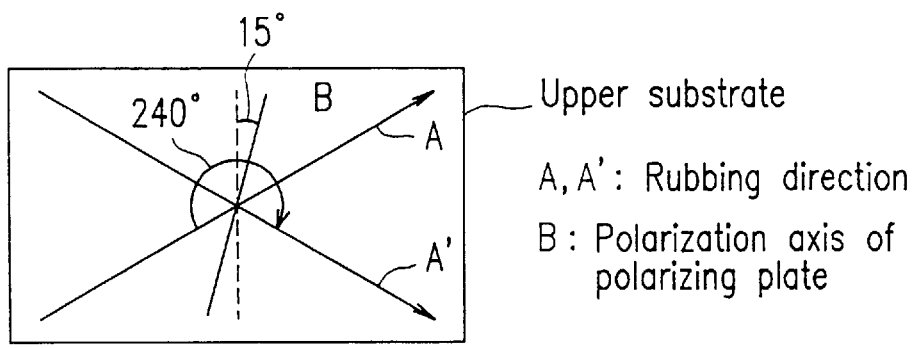
FIGS. 7A and 7B are schematic views illustrating angles of the polarization axes of a pair of polarizing plates disposed in an exemplary liquid crystal display device of the present invention.
Figure 7B:
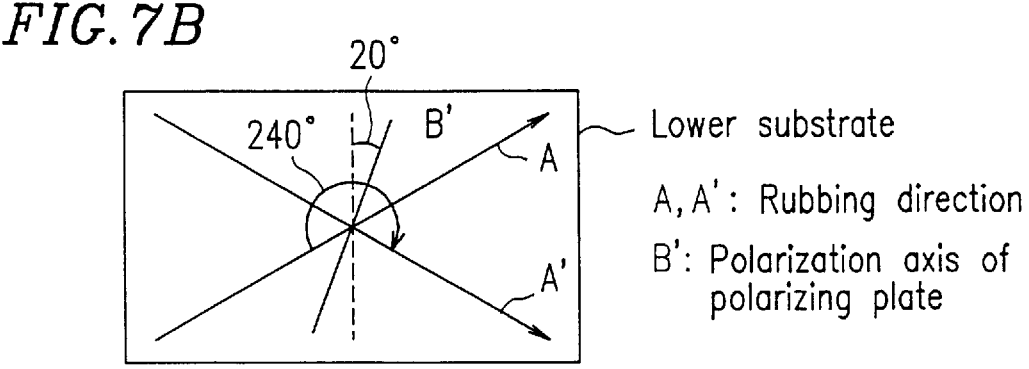

Polarizing plates, a reflecting plate and a retardation film were attached to the liquid crystal cell to obtain a liquid crystal display device. The angles of the polarizing plates were set as shown in FIGS. 7A and 7B. In FIGS. 7A and 7B, reference letters A and A' denote rubbing directions on upper and lower substrates, and reference letters B and B' denote polarization axes of the respective polarizing plates. The retardation film was disposed such that white display in pixel regions became most bright during application of no voltage.

When L*, a* and b* in CIE color system of this device were measured, the results were L*=47.8, a*=2.8, and b*=3.2. FIG. 8 shows the relationship between the L*, a* and b* and colors in the CIE color system.

In thus produced liquid crystal display device, since no spacers existed in pixel regions, alignment of liquid crystal molecules was not seriously disturbed by spacers, and display state was significantly satisfactory. This liquid crystal display device did not suffer from a serious change in the cell gap by external pressure and had excellent strength (i.e., pressure resistance, impact resistance). Furthermore, this liquid crystal display device had birefringence in the portion of non-pixel regions where the photosensitive film was formed (the portion where polymeric walls were formed in a conventional device). Thus, deterioration of hue due to the polymeric walls was reduced, and thus the liquid crystal display device had an excellent hue.

Comparative Example 1

A liquid crystal cell was produced in the same manner as in Example 5, except that the photosensitive film was not provided and the spacers were distributed on the entire face of the substrate.

When the liquid crystal cell was pressed at a pressure of 200 g/mmφ by a metal rod with an end diameter of 1 mmφ, unsatisfactory alignment of liquid crystal molecules due to a change in the cell gap was observed.

Polarizing plates, a reflecting plate and a retardation film were attached to the liquid crystal cell in the same manner as in Example 5 to obtain a liquid crystal display device.

The thus produced liquid crystal display device suffered from a change in the cell gap by external pressure and had insufficient strength (i.e., pressure resistance, impact resistance). Furthermore, in this liquid crystal display device, alignment of liquid crystal molecules due to distributed spacers was unsatisfactory. This unsatisfactory alignment led to point defects during display.

Comparative Example 2

A liquid crystal cell was produced in the same manner as in Example 5, except that polymeric walls formed using a liquid resist was provided instead of the photosensitive film.

As the liquid resist, a mixture of 100 parts by weight of a positive resist (OFPR-800, manufactured by Tokyo Ohka Kogyo Co., Ltd.) and one part by weight of spacers with a diameter of 4.5 μm was used. The resist was applied by spin coating and subjected to exposure and development to form polymeric walls. The procedure other than this was the same as in Example 5.

When the cell gap of the thus produced liquid crystal cell was measured, the result was an average of 4.3 μm, 3σ=0.28 μm.

Polarizing plates, a reflecting plate and a retardation film were attached to the liquid crystal cell in the same manner as in Example 5 to obtain a liquid crystal display device.

When L*, a* and b* in the CIE color system of this liquid crystal display device were measured, the results were L*=37.2, a*=−18, and b*=−20. The liquid crystal display device was blue as a whole and displayed a dark hue.

Example 6

A liquid crystal display device was produced using the photosensitive film having a variety of retardation values in the same manner as in Example 5. Then, the brightness and hue were evaluated by L* values in the CIE color system.

Figure 9:
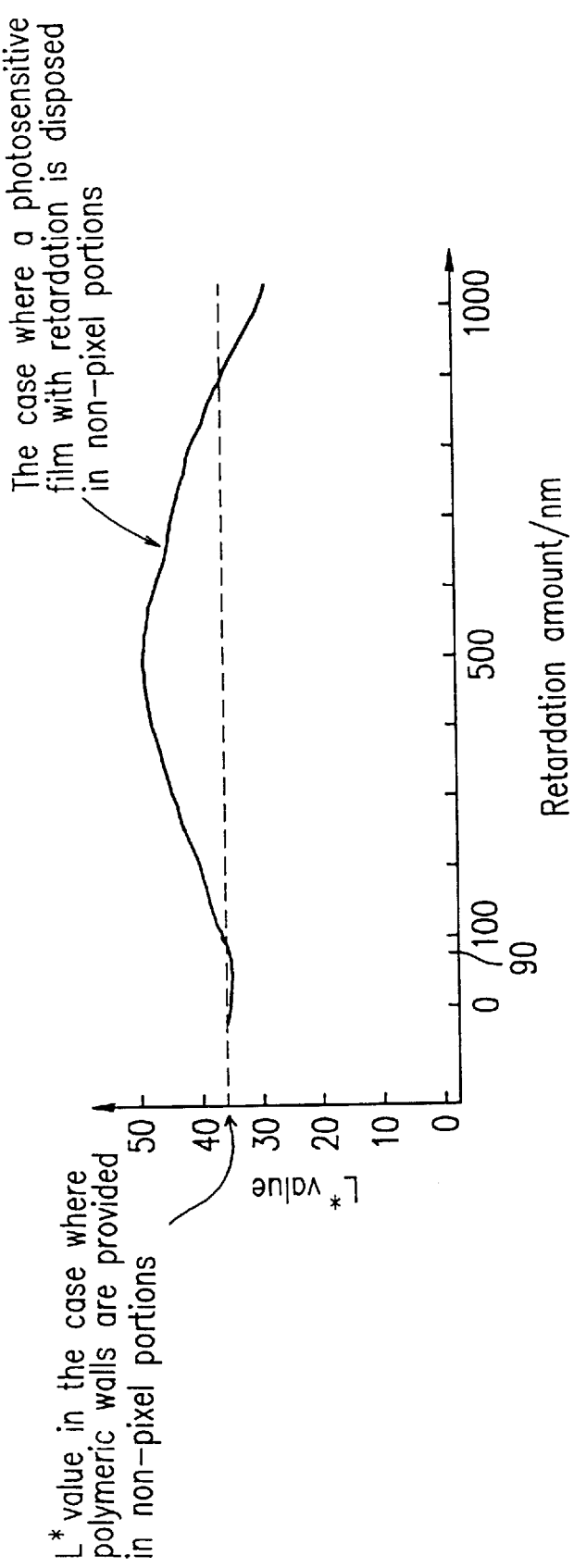
FIG. 9 is a graph illustrating the relationship between retardation values and L* values of a photosensitive film.

FIG. 9 is a graph showing the relationship between retardation values and L* values of the photosensitive film. A broken line in FIG. 9 shows a L* value of the liquid crystal display device having conventional polymeric walls. As seen from FIG. 9, by using the photosensitive film of the present invention, the L* value becomes larger (i.e., the liquid crystal display device using the photosensitive film of the present invention has even better brightness and hue). In particular, improvement of brightness and hue is significant at a retardation value in the range of 200 to 800 nm.

Example 7

A liquid crystal display device described at B-3 was produced by the following procedure.

An ITO layer was deposited with a thickness of 2000 Å on a pair of substrates (7059 glass manufactured by Corning Inc.) by sputtering and patterned to form striped transparent electrodes with a width of 280 μm and a gap of 20 μm. Herein, the direction of the stripes of the transparent electrodes formed on one of the substrates agreed with the longitudinal direction of the substrate, while the direction of the stripes of the transparent electrodes formed on the other substrate agreed with the direction perpendicular to the longitudinal direction of the substrate. Furthermore, an electrical insulator layer made of $SiO_2$ was formed with a thickness of 1000 Å by sputtering so as to cover the transparent electrodes. Furthermore, an alignment layer made of a polyimide resin was formed with a thickness of 800 Å by flexography. Then, the substrates were subjected to a rubbing treatment with a nylon fabric so that liquid crystal molecules are in a predetermined alignment state when the substrates were attached to each other so that the respective transparent electrodes crossed each other.

On the other hand, a photosensitive film (retardation value: 480 nm) was produced in the same manner as in Example 2, except that spacers with a diameter of 4.5 μm were added. A cover layer of polyethylene terephthalate is provided on one face of the film in order to improve manipulability, and then the film was wound onto a roll. This film was attached to the substrate by the following procedure.

The substrate was preheated at 60° C. for 10 minutes. Then, the obtained roll was fed at a rate of 1.5 m/min. while the cover layer of the roll was being peeled off. Thus, the photosensitive film was attached to the substrate at a temperature of 80° C. and a pressure of 4 kg/cm$^2$.

The attached photosensitive film was irradiated with ultraviolet rays at 120 mJ/cm$^2$ via a photomask shielding a portion from light where the transparent electrodes were formed (i.e., the portion where the transparent electrodes were not formed was selectively irradiated with ultraviolet rays). Next, a developing treatment was performed using a 1% sodium carbonate solution. Thus, the photosensitive film was formed in stripes in the portion where the transparent electrodes were not formed on the substrate.

The substrate provided with the photosensitive film was attached to the other substrate on the periphery with a sealant so that the respective transparent electrodes crossed each other. The photosensitive film and the sealant were positioned as shown in FIG. 5.

A mixture of a liquid crystal material, a photopolymerizable material and a photopolymerization initiator was injected between the attached substrates at about 30° C. by a known method to produce a liquid crystal cell. As a liquid crystal material, 4.2 g of MLC-6069 (manufactured by Merck & Co., Inc.) including 0.3% of a chiral agent (S-811), 0.2 g of R-684 (manufactured by Nippon Kayaku Co., Ltd.) and 0.08 g of p-phenyl styrene (manufactured by Nippon Kayaku Co., Ltd.) as a photopolymerizable material, and 0.02 g of Irgacure 651 (manufactured by Chiba-Geigy Corporation) as a photopolymerization initiator were used.

The liquid crystal cell was heated to 120° C. at which the liquid crystal material exhibited an isotropic state, and the liquid crystal cell was irradiated with ultraviolet rays at an illuminance of 10 mW/cm$^2$ for 180 seconds using a high pressure mercury lamp via a photomask shielding pixels from light. Then, the liquid crystal cell was cooled to room temperature (about 25° C.) at a cooling rate of 7° C./min. in a slow cooling oven. Furthermore, in order to completely cure unreacted polymerizable compound, the liquid crystal cell was irradiated with ultraviolet rays for a short period of time and at a weak light intensity. Thus, liquid crystal regions and polymeric walls were formed. The liquid crystal regions were surrounded by the polymeric walls and the photosensitive films.

When the cell gap of the thus produced liquid crystal cell was measured, the result was an average of 4.4 μm, 3σ=0.09 μm. When the liquid crystal cell was pressed at a pressure of 300 g/mmφ by a metal rod with an end diameter of 1 mmφ, unsatisfactory alignment of liquid crystal molecules due to a change in the cell gap was not observed.

Polarizing plates, a reflecting plate and a retardation film were attached to the liquid crystal cell to obtain a liquid crystal display device. The angles of the polarizing plates were set as shown in FIGS. 7A and 7B, and the retardation film was disposed such that white display in pixel regions became most bright under application of no voltage.

When L*, a* and b* in the CIE color system of this liquid crystal display device were measured, the results were L*=44.2, a*=−3.6, and b*=−4.2.

In the thus produced liquid crystal display device, since no spacers exist in pixel regions, alignment of liquid crystal molecules was not seriously disturbed by spacers, and display state was significantly satisfactory. This liquid crystal display device did not suffer from a serious change in the cell gap by external pressure because the substrates were supported by both the photosensitive films and the polymeric walls (i.e., the substrates were supported in a wider area). Thus, the liquid crystal display device had excellent strength (i.e., pressure resistance, impact resistance). Furthermore, this liquid crystal display device had birefringence in the portion of non-pixel regions where the photosensitive film was formed (the portion where polymeric walls were formed in a conventional device). Thus, deterioration of hue due to the polymeric walls was reduced, and thus the liquid crystal display device had excellent hue.

Example 8

A liquid crystal display device described at B-4 was produced by the following procedure.

An ITO layer was deposited with a thickness of 2000 Å on a pair of substrates (7059 glass manufactured by Corning Inc.) by sputtering and patterned to form striped transparent electrodes with a width of 280 μm and a gap of 20 μm. Furthermore, an electrical insulator layer made of $SiO_2$ was formed with a thickness of 1000 Å by sputtering so as to cover the transparent electrodes. Furthermore, an alignment layer made of a polyimide resin was formed with a thickness of 800 Å by flexography. Then, the substrates were subjected to a rubbing treatment with a nylon fabric so that liquid crystal molecules were in a predetermined alignment state when the substrates were attached to each other so that the respective transparent electrodes crossed each other.

Next, spacers were distributed, and the substrates were attached to each other on the periphery with a sealant so that the respective transparent electrodes crossed each other.

A mixture of a liquid crystal material, a photopolymerizable material and a photopolymerization initiator was injected between the attached substrates at about 30° C. by a known method to produce a liquid crystal cell. Herein, 3.48 g of MLC-6069 (manufactured by Merck & Co., Inc.) including 0.3% of a chiral agent (S-811) as the liquid crystal material, 0.4 g of R-684 (manufactured by Nippon Kayaku Co., Ltd.) and 0.1 g of p-phenyl styrene (manufactured by Nippon Kayaku Co., Ltd.) as a photopolymerizable material, and 0.02 g of Irgacure 651 (manufactured by Chiba-Geigy Corporation) as a photopolymerization initiator were used.

The liquid crystal cell was heated to 120° C. at which the liquid crystal material exhibited an isotropic state, the liquid crystal cell was irradiated with ultraviolet rays at an illuminance of 10 mW/cm$^2$ for 180 seconds using a high pressure mercury lamp via a photomask shielding pixels from light. Then, the liquid crystal cell was cooled to room temperature (about 25° C.) at a cooling rate of 7° C./min. in a slow cooling oven. Furthermore, in order to completely cure unreacted polymerizable compound, the liquid crystal cell was irradiated with ultraviolet rays for a short period of time and at a weak light intensity. Thus, liquid crystal regions and polymeric walls were formed. The liquid crystal regions were surrounded by the polymeric walls and the photosensitive films.

On the other hand, a photosensitive film was produced in the same manner as in Example 1, except that retardation value was set to 500 nm, and wound onto a roll. This film was attached to one of the substrates of the liquid crystal cell by the following procedure.

The substrate was preheated at 60° C. for 10 minutes. Then, the obtained roll was fed at a rate of 1.5 m/min. while the cover layer of the roll was being peeled off. Thus, the photosensitive film was attached to the substrate at a temperature of 70° C. and a pressure of 4 kg/cm$^2$.

The attached photosensitive film was irradiated with ultraviolet rays at 120 mJ/cm$^2$ via a photomask shielding pixels from light (i.e., non-pixel regions were selectively irradiated with ultraviolet rays). After the base layer was peeled off, a developing treatment was performed using a 1% sodium carbonate solution. Thus, a photosensitive film was formed in a matrix in the non-pixel regions (i.e., the portion corresponding to polymeric walls in a conventional liquid crystal display device).

Polarizing plates, a reflecting plate and a retardation film were attached to the liquid crystal cell to obtain a liquid crystal display device.

When L*, a* and b* in the CIE color system of this liquid crystal display device were measured, the results were L*=47.6, a*=3.0, and b*=3.2. FIG. 8 shows the relationship between L*, a* and b* and colors in CIE color system. A contrast of the liquid crystal display device was 7.

When the liquid crystal display device of the present example was compared with the liquid crystal display device of Comparative Example 3 described below, the former was much brighter than the latter. Moreover, the liquid crystal display device of the present invention displayed white under application of no voltage and black under application of a voltage.

Comparative Example 3

A liquid crystal cell was produced in the same manner as in Example 8, except that the photosensitive film was not provided. Polarizing plates, a reflecting plate and a retardation film were attached to the liquid crystal cell so that the color displayed in the liquid crystal regions became close to white. Thus, a liquid crystal display device was obtained. This liquid crystal display device presented a dark blue color in the polymeric portions, and the substrate as a whole appeared blue.

When L*, a* and b* in the CIE color system of this liquid crystal display device were measured, the results were L*=38.5, a*=−18, and b*=−23. In this liquid crystal display device, both a* and b* values were shifted to the blue side, compared with the liquid crystal display device of Example 8. Thus, the liquid crystal display device of the Comparative Example 3 was far from displaying black and white.

Furthermore, the contrast of this liquid crystal display device was 5, which was lower than the liquid crystal display device of Example 8.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. In a liquid crystal display device having a pixel portion and a non-pixel portion, a photosensitive film having birefringence, which is disposed only on said non-pixel portion of said liquid crystal display device.

2. A liquid crystal display device according to claim 1, wherein polymer molecules constituting the film are aligned in a uniaxial direction.

3. A liquid crystal display device according to claim 1, wherein polymer molecules constituting the film are aligned in biaxial or more directions.

4. A liquid crystal display device according to claim 1, wherein a retardation value of the film is in a range from 90 nm to 800 nm.

5. A liquid crystal display device according to claim 1, wherein the photosensitive film is a negative film formed of a mixture comprising a photosensitive polymer, a photosensitive monomer and a photopolymerization initiator.

6. A liquid crystal display device according to claim 1, wherein the photosensitive film is a positive film formed of a mixture comprising a sensitizer and a polymeric material for retaining the sensitizer.

7. A liquid crystal display device according to claim 1, wherein at least one face of the film is covered with a polymer sheet, a polymer film or a paper.

8. A photosensitive film according to claim 5, wherein the photosensitive polymer is selected from the group consisting of perfect saponified poly(vinyl alcohol), partial saponified poly(vinyl alcohol), poly-D-lysine, poly-L-lysine, poly-D-glutamic acid, poly-L-glutamic acid, poly-D-histidine and poly-L-histidine.

9. A photosensitive film according to claim 6, wherein the photodegradable polymer is selected from the group consisting of an ethylene-carbon monoxide copolymer, a vinyl chloride-carbon monoxide copolymer and polybutadiene.

10. A photosensitive film according to claim 6, wherein the sensitizer is selected from the group consisting of naphthoquinone~azide type compound and onium salt.

11. A method for producing a photosensitive film having birefringence on a liquid crystal display device, said method comprising the steps of:

forming a photosensitive film which is disposed only on a non-pixel portion of the liquid crystal display device; and drawing the photosensitive film to align polymer molecules constituting the photosensitive film in a predetermined direction to provide birefringence.

12. A liquid crystal display device including a pair of substrates provided with a plurality of pixels and a liquid crystal region formed of liquid crystal as a display medium, the liquid crystal region being interposed between the pair of substrates, wherein a photosensitive film having birefringence is provided on at least one face on the liquid crystal region side of the substrates so as to surround at least one pixel, and is disposed only on a non-pixel portion of the liquid crystal display device.

13. A liquid crystal display device according to claim 12, wherein the photosensitive film comprises spacers.

14. A liquid crystal display device including a pair of substrates provided with a plurality of pixels and a liquid crystal region formed of liquid crystal as a display medium, the liquid crystal region being interposed between the pair of substrates, wherein a photosensitive film having birefringence is provided in stripes on at least one face on the liquid crystal region side of the substrates, and wherein the photosensitive film is disposed only on a non-pixel portion of the liquid crystal display device.

15. A liquid crystal display device including a pair of substrates provided with a plurality of pixels, a liquid crystal region formed of liquid crystal as a display medium and a polymeric portion, the liquid crystal region and the polymeric portion being interposed between the pair of substrates, wherein a photosensitive film having birefringence is provided in stripes on at least one face on the liquid crystal region side of the substrates, and the polymeric portion and the photosensitive film adjacent thereto surround at least one pixel.

16. A liquid crystal display device including a pair of substrates provided with a plurality of pixels, a liquid crystal region formed of liquid crystal as a display medium and a polymeric portion, the liquid crystal region and the polymeric portion being interposed between the pair of substrates, wherein a photosensitive film having birefringence is disposed on at least one face of at least one of the substrates, substantially corresponding to a pattern of the polymeric portion.

17. A liquid crystal display device according to claim 16, wherein the photosensitive film is provided on a face on the liquid crystal region side of the substrate.

18. A method for producing a liquid crystal display device comprising the steps of preheating at least one substrate, attaching a photosensitive film having birefringence to the preheated substrate using heat and pressure, and irradiating predetermined portions of the photosensitive film with light so as to form regions having birefringence in desired portions of the liquid crystal display device.

19. A method for producing a liquid crystal display device according to claim 18, further comprising the step of irradiating predetermined portions of the photosensitive film with light so as to form regions having birefringence in desired portions of the liquid crystal display device.

20. In a liquid crystal device having at least one pixel and a non-pixel portion, a photosensitive film having birefringence, which surrounds said at least one pixel of said liquid crystal display device and is disposed only on said non-pixel portion of said liquid crystal display device.

* * * * *